(12) United States Patent
Keenan et al.

(10) Patent No.: US 11,200,228 B2
(45) Date of Patent: *Dec. 14, 2021

(54) INTEGRATED OBJECT ENVIRONMENT SYSTEM AND METHOD

(71) Applicant: American International Group, Inc., New York, NY (US)

(72) Inventors: Sean C. Keenan, Reading, CT (US); James G. Barrett, New York, NY (US); Gordon Cooper, Spring, TX (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/957,828

(22) Filed: Apr. 19, 2018

(65) Prior Publication Data

US 2018/0307780 A1 Oct. 25, 2018

Related U.S. Application Data

(60) Provisional application No. 62/487,370, filed on Apr. 19, 2017.

(51) Int. Cl.
*G06F 16/242* (2019.01)
*G06F 16/904* (2019.01)
(Continued)

(52) U.S. Cl.
CPC ...... *G06F 16/2443* (2019.01); *G06F 16/2445* (2019.01); *G06F 16/289* (2019.01); *G06F 16/904* (2019.01); *G06F 16/9024* (2019.01); *G06F 3/04842* (2013.01); *G06F 2203/04806* (2013.01)

(58) Field of Classification Search
CPC .. G06F 3/0484; G06F 3/04842; G06F 3/0485; G06F 16/904; G06F 16/289; G06F 16/9024; G06F 2203/04806; G06F 2203/048
See application file for complete search history.

(56) References Cited

U.S. PATENT DOCUMENTS 6,889,309 B1 * 5/2005 Oliveira ................. G06F 16/10
707/E17.01
2004/0039745 A1 * 2/2004 Evans ................... G06F 16/289
707/999.1
(Continued)

OTHER PUBLICATIONS

"Add shapes," Feb. 24, 2016, Microsoft, retrieved via Wayback Machine, pp. 1-5. (2016).*
(Continued)

*Primary Examiner* — Ashish Thomas
*Assistant Examiner* — Jedidiah P Ferrer
(74) *Attorney, Agent, or Firm* — Snell & Wilmer L.L.P.; Lisa M. Knight

(57) ABSTRACT

A system and method are described to create and use an Integrated Object Environment (IOE) running in a graph database environment. Uses include storing, revealing and maintaining value and risk of information assets, such as the topology of an analytical infrastructure in query-driven, graph database. A graphical user interface is described to permit importation, viewing, modification and querying in the IOE.

19 Claims, 16 Drawing Sheets

(51) Int. Cl.
*G06F 16/28* (2019.01)
*G06F 16/901* (2019.01)
*G06F 3/0484* (2013.01)

(56) References Cited

U.S. PATENT DOCUMENTS

| | | | |
|---|---|---|---|
| 2005/0171746 A1* | 8/2005 | Thalhammer-Reyero | ................... G06F 30/20 703/2 |
| 2008/0177839 A1* | 7/2008 | Chang | .................... G06Q 10/10 709/205 |
| 2011/0270857 A1* | 11/2011 | Bommireddipalli | ........................ G06F 16/284 707/758 |
| 2011/0307870 A1* | 12/2011 | Stairs | .................... G06F 11/362 717/128 |
| 2014/0372956 A1* | 12/2014 | Bisca | ....................... G06F 16/93 715/848 |
| 2016/0239185 A1* | 8/2016 | Balimidi | ............... G06F 3/0482 |
| 2017/0085456 A1* | 3/2017 | Whitner | .................. H04L 43/08 |
| 2018/0020057 A1 | 1/2018 | Koo | |
| 2018/0089601 A1 | 3/2018 | Link et al. | |

OTHER PUBLICATIONS

USPTO; Non-Final Office Action dated Jun. 17, 2021 in U.S. Appl. No. 16/577,413.

* cited by examiner

INTEGRATED OBJECT ENVIRONMENT SYSTEM AND METHOD

CROSS-REFERENCE TO RELATED APPLICATIONS

This application claims the benefit of U.S. Provisional Application No. 62/487,370 filed Apr. 19, 2017, the content of which is incorporated by reference for all that it discloses.

BACKGROUND

In previous business analysis systems, complex, analytically intensive generation of numerical output for business decisions have not also conveyed to the benefactors of those business decisions the costs, risks and accountability inherent in the information assets employed to generate such output.

SUMMARY

According to embodiments of the present invention, an Integrated Object Environment (IOE) running in a graph database environment is used. Diagrams of the production chain of information assets are created. These diagrams depict data flows linking together these information assets, for which the final product is calculated output ("calcs") used for a specific business purpose. These diagrams are loaded into a repository that stores, reveals and allows for maintenance of the topology.

Embodiments include a standard of diagramming for classifying the objects and defining the format of the diagram. Design of object classifications is suited to capture the properties of the information assets in a way that associates the risk, cost, quality, accountability of the assets to the product chain that produces calcs which the business utilizes to set premiums and reserves, manage investment risk and produce financial reports and compliance reports. The same end-to-end production chain of information assets that produces calcs is represented in the topological repository and connected with its respective properties using the IOE. These properties (e.g. costs, risks and accountability) are then compiled and aggregated via their objects in the topology along the production chain which produced the calc and as such can then be associated with the business outcome that the calc enabled.

The system stores, reveals and links characteristics (Structural Metadata) of each object in the topology either within the IOE or in a linked repository, such that accountability, benefits and consequences of using those assets can easily and repeatedly be measured in the cost and profitability of the outcomes those assets enable.

The system provides a wide-variety of visual presentation options of the topology allowing the user to view, using GUI, a subset of the topology by selecting use, object function class, functional specificity, relationship to specific object and other criteria. It provides a medium for applying user-provided logic to the topology directly, so that any component or aspect of it can be isolated, retrieved, and assessed.

The system preferably operates according to a set of principles, including:
a) Every object class is unique and designed to allow for specific features including states.
b) A library of object classes created is parsimonious to allow for a wide range of uses and allows for a high degree of scalability and modularization.
c) The IOE stores objects and their relationships as well as the object's structural metadata ("Characteristics").
d) Diagrams are rendered by a front end/GUI of the IOE and are both input and output of the IOE. Diagrams are not stored in the IOE; instead the diagram serves as a communication medium to and from users and the IOE.
e) There is a one to one relationship between an object class and a diagram shape.
f) The diagramming standards are pre-specified sets of object shapes and formats and other visual elements.
g) Diagrams created in the IOE automatically synchronize with same intelligence stored in structural metadata associated with the object; objects are related to other objects through "links" that obey pre-set rules, thus establishing the logic of the topological structure and enforcing integrity within the system.
h) The IOE preferably differentiates between 'hard data' (i.e. observations and measurements, and arithmetic combinations thereof) and 'calculations' which represent modeled combinations of inputs. The former are referred to herein only as 'data' and the latter as 'calcs'.
i) Read and write access is for multiple levels of engagement, including: i) access and permissions are incorporated based on user function, structural metadata (Characteristics) describing business organization structure and business use cases; and ii) all user levels have access to a simple, fast, and feature-rich application set.
j) At least one object in a Task Sequence topology exists in an Infrastructure topology.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings.

DETAILED DESCRIPTION

Figure 1:
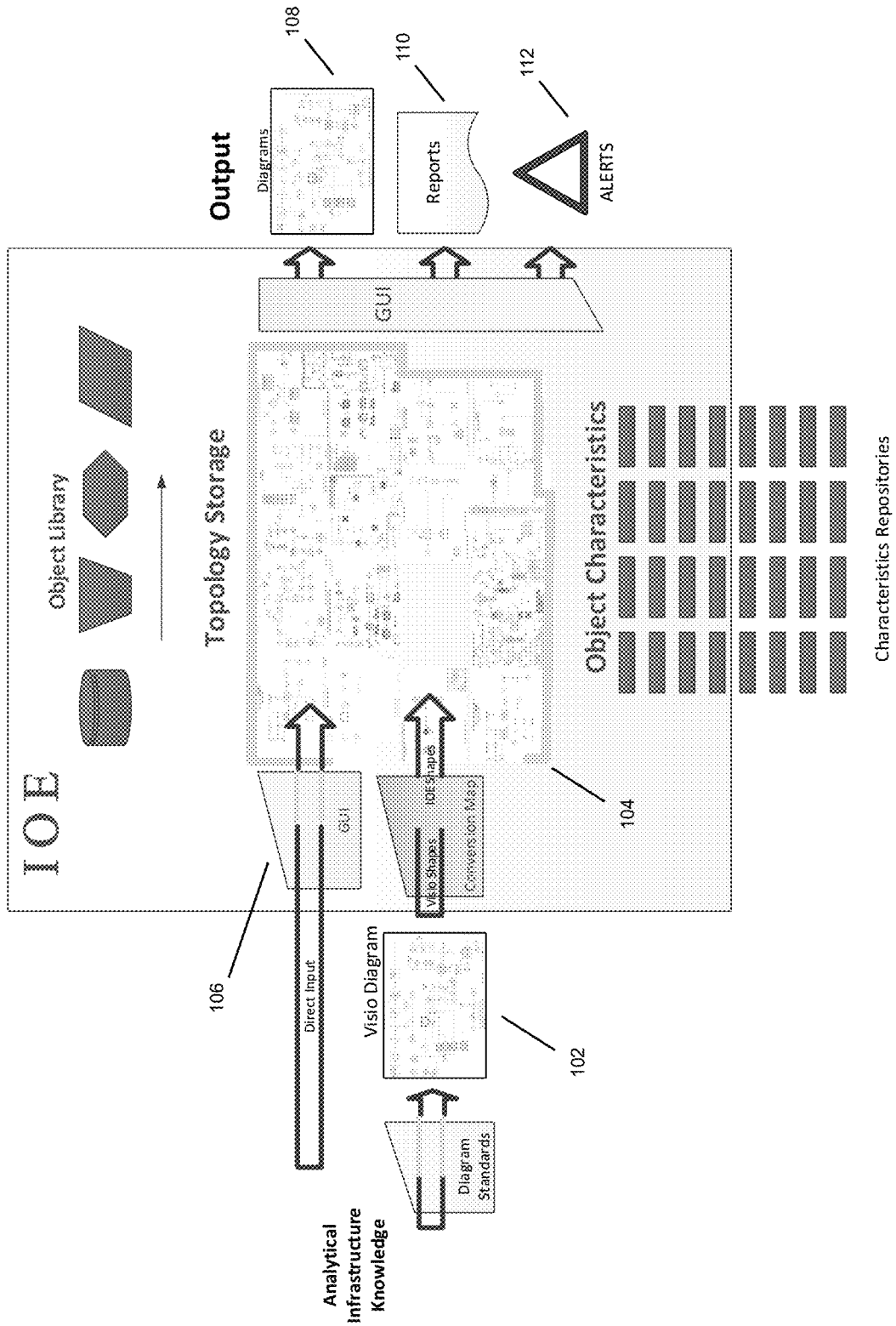
FIG. 1 is a diagram illustrating an integrated object environment represented in a graph database, in accordance with an embodiment of the invention.

With respect to the remainder of this specification, certain terms should be understood as follows, to the extent that they are not otherwise readily understood by those skilled in the relevant arts or from elsewhere in the specification:

Analytical Infrastructure (topology): Depicts Information Assets and information in motion between information assets.

Branch: Term that is used only relative to a selected Path. It is a linear string of linked objects joining a Path at a fork.

Business Affiliation: Business entity associated with object.

Business Metric: Financial value resulting from the information produced by a production chain, tree, Path, Branch or any other collection of objects acting in concert.

EUT/EUC (End User Tool/End User Computing Tool): Software (e.g. Excel spreadsheet) that manipulates data and whose output is consumed by a model, another EUT/EUC or used in a final business report. Some models are EUTs.

Calcs: Output from a model. It remains in this state for its life and thus never reverts to being referred to as "data. If data is transposed or otherwise manipulated by a non-model tool (e.g. excel spreadsheet) the output from this tool is still referred to as "data". External (to the company) model output is also considered "calcs".

Canvas: Physical screen space in the IOE Modification layer where user builds or modifies topology Characteristics: Structural Metadata that describe the properties of an object.

Diagram: Communication vehicle between user and the IOE and between the IOE and the user depicting static topological information in a format selected by, and consumable by users which can be set in documentation, stored as a file in other applications. This term contrasts with the term for the visual depiction of topology seen in the GUI of the IOE which is referred to as a "View". Another way to understand a diagram is as a fixed portion of the topology. A diagram is topology packaged to be communicated.

Direct Model: Term specific to the CCAR Model Risk Buffer Calculation, model that is mapped to CCAR Scenario Loss.

Fork: Two or more Branches joining at a single object.

Hops: The number of data flow objects between two non-data flow objects.

Immediate (upstream or downstream): First non-data flow object upstream of a selected object ("immediate upstream") also defines the first non-data flow object downstream from a selected object ("immediate downstream").

Instance: As used in this document, an instance of an object in a diagram represents not the Objects absolute location in the topology but rather the location of a point in a Linear View where Flow Objects extract from or load to the Object. The reason why multiple instances are used is to depict the production chain of the analytical infrastructure when multiple extracts and loads to the same database are required. In the Network View, there is only one instance of an Object which in the case of multi-use Storage Object will show the linkages of Objects to a single Storage Object thus obfuscating the production chain linearity.

Junction: Multiple Paths join in at a single object and multiple Paths exit from this object.

Junction Problem: Situation where multiple Paths join at a Junction but no information from one or more upstream Paths is conveyed, in any form, by the downstream Paths. This creates a problem for tracking the data lineage and requires that data elements be characteristics of Data Flow objects in order to trace the flow of information through a Junction.

MLD (Model Level Diagram): Type of IOE diagram centered around a specific model. The purpose of this diagram is to depict feeds into the model from all sources (including other models) and the destination of the output (including other models). MLDs are joined together to form Stream Diagrams.

Module: internal component of a model which produces output consumed within the model.

Path: A sequential set of objects connected by data flow without a fork. It is defined by a single object on the upstream end and a single object on the downstream end. It is possible to have a multiple paths starting at the designated upstream object and ending at the designated downstream object although this would indicate a probable misconstruction of the diagram or process.

Production Chain: Collection of objects used in the creation of specific business useable output (delivery tool object contents)

Structural Metadata: For this document, the term "Characteristic" is used interchangeably. Examples of structural metadata for most objects: owner, risk measurement, age, business affiliation, users System Administrator (IOE System Administrator): The individual with the authority and access rights for setting rules, operating parameters, Alerts and Acceptance Criteria of the IOE.

Topology: Representation of the relationships between objects in an analytical infrastructure. In the case where analytical infrastructure produces information, these relationships represent the storage, processing and flow of information. Communicating topology to and from the IOE is done with diagrams.

Tree: The collection of objects (or a specific class of objects; models for example "Model Tree") that are on the paths feeding a selected object from upstream or the collection of objects on paths fed from a specific object downstream. Phraseology would be "Upstream tree of object X". Or "Upstream Model tree of Model x".

Task Sequence (Topology): Depicts tasks in process order sequence including tasks that require use of information assets.

Ultimate (upstream or downstream): Object depicted as the first object upstream of a selected object ("ultimate upstream") also the final object downstream from a selected object ("ultimate downstream").

View: Depiction of topology in the IOE via GUI. A view that is exported or printed from the IOE is a "Diagram".

View Box: that portion of the IOE GUI screen that contains the View.

The IOE, as effected in embodiments, effectively represents a dynamic map of an enterprise's analytic infrastructure, preferably including all physical assets that contribute to analysis, analytic reporting, and the information created by processing data. The major components of the IOE appear in FIG. 1. In general, each real world component in the infrastructure is defined as an object with associated characteristics such as state, and its relationship to other objects. The objects and characteristics are stored in a graphical format 102 such as a Visio file. The system converts the Visio files 102 into a standard, canonical format for storage in a topology graph database 104 of the infrastructure. Alternatively, a GUI 106 is provided for inputting directly into the topology database. Rendering software (GUI) 106 converts the graph database and associated characteristics into Views, which are exportable as diagrams 108, as well as reports 110 and alerts 112.

In greater detail with respect to FIG. 1, the IOE preferably resides in a graph database utilizing, object-oriented storage technology, where each physical infrastructure component is represented by an object class from a parsimoniously designed object class set. The relationships among objects are represented by a parsimonious set of pre-defined links. The data flow between the objects is also defined as an object class. The object classes and links have features that allow for its characterization including specification of its state. The relationships characterizing the links between objects are preferably fixed (non-modifiable), to accommodate a restriction on data flow objects feeding into other data flow objects. This environment permits storage of the objects that represent the analytic infrastructure, and the structural metadata. A scripting language is preferably adopted and an interface designed that allows users to build and store/run complex programming statements that apply logic directly to the topology or any subset thereof.

In embodiments, each object class and sub-class is itself represented as a list of fixed characteristics—the fixed set of characteristics define the object class, and establish the response mode for the logical functions, as further described below. The object class may also have a state variable as part of the characteristic set. Each class may also permit extension to include user-defined characteristics. From a core technology perspective, however, such user-defined characteristics preferably do not affect the behavior of the objects.

Objects that contain all of the information for the fixed characteristic set that defines them are considered "fully identified". Objects that do not contain all of the information for the fixed characteristic set that defines them are considered "under-identified". Under-identified objects may exist with the IOE but may not be supported by the full complement of internal functions.

Each object preferably has two identifiers: one internal to the IOE, and one that ties the object to an authoritative external repository. For example, all models in a company inventory (current, historical, and to some extent prospective) may be entries in one external data model characteristics repository system, along with a wide variety of descriptive data and metadata. Therefore, all "model" objects in the IOE preferably carry their repository IDs as well as an ID internal to the IOE. By extension, all objects in the IOE, with the exception of data flow objects are associated with an authoritative external information repository, and linked directly to that repository by an ID unique to that repository. Objects without such a linkage are under-identified. The external identifier is preferably flexible to accommodate any potential diversity.

In an embodiment, every object in the IOE preferably carries with it, in addition to its defining object-specific and topology-related information: i) An object class identifier; ii) A creation date; iii) A creation source code; iv) An internal IOE ID; and v) An external repository ID. Objects independent of the infrastructure can be stored in the IOE. These relationships are referred to as Task Sequence relationships as opposed to Infrastructure relationships.

The analytical infrastructure is a network of analytical components such as models, EUTs, databases, reports and dataflow information assets. There is immense diversity in the ecosystem of the analytical infrastructure. However, the IOE framework and approach is to place structure within this diversity and group the real-world components into object classes. Objects classes are preferably further grouped into sub-classes. Objects are preferably as parsimoniously constructed as possible to enhance control, reduce clutter and maintenance costs. For each object class, characteristics are grouped into three categories: i) Required (mandatory, failure to include results in an under-identified object); ii) Pre-specified (information normally expected to, that supports general querying); and iii) User-defined (allowable extensions to the data/metadata embedded directly in the object).

Embodiments preferably identify at least eight different Object Classes: 1) Storage Objects; 2) Flow Objects; 3) Processing Objects; 4) Model Objects; 5) Platform Objects; 6) Delivery Tool Objects; 7) Composite Objects; and 8) Unclassified Objects.

In greater detail, Storage Objects (or Data Storage) includes databases, text files, spreadsheets wherein the purpose is to store data—even if temporarily. Effectively, if data, destined for inclusion in analysis or reporting, is held in a location then a data storage object must exist. While data generally is viewed as "physical" and part of the overall analytic infrastructure, production data at rest and in bulk is not objectified. For data storage objects, certain boundary cases can be identified: models and modeling platforms usually require input files, which may remain resident as objects serving only within those environments. As these tend to be single-use objects and not formatted for secondary retrieval, they are preferably excluded from the topology. Alternatively, certain modeling platforms require the creation of data files that do contemplate re-use or multipurpose use, and explicitly facilitate their use for data storage. SAS data files/databases, for example, fall into this category and are included in the topology as data storage objects. Such a definition of data storage objects suggests that many may not be inventoried in any external repository, and key characteristics and metadata may not be available, resulting in under-identified objects. However, under-identified data storage objects likely fit primarily into a few sub-classes (e.g. non-model EUTs) and small improvements in the control environment can be employed to reduce their number significantly.

Flow Objects represent the passing of data from one object to the other. (The specification distinguishes between quantitative historical observations, or true "data", and model outputs which are not observations but expectations or estimates, called "calcs". For brevity in the specification, the common convention of applying the term "data" to cover both data and calcs is used. Where relevant, the distinction is made explicit.) As such, each object preferably includes: i) Field names; ii) Frequency code and time/date stamp; iii) Technology code (e.g. ETL, SELECT statement, Read( ) statement, etc.); and iv) Data Quality (DQ) grade. While data flow objects have direction, with the source and destination information represented in the topology, direction is implicitly included and so an explicit direction feature does not need to be embedded in the objects themselves. Data element level information preferably identifies whether it is "datum" or is "calc". Data flow objects link to downstream objects using a "passes to" concept in the data flow object, as opposed to characterizing the linkage as "receives from" in the downstream object.

Processing Objects perform non-model operations on data. This includes the application of arithmetic functions as well as aggregation (or potentially dis-aggregation) of granular data, the combining of data from different sources without applying any modeling, and the reformatting of data.

Model Objects receive data and/or outputs from other models, and generate outputs restricted to: i) Forecasts/projection; ii) Estimates of unknown/unobservable values; iii) Probability measures including probability distributions and values derived therefrom; and iv) Quantitative hypothesis test values. It is the generation of any of these outputs that defines a model. Models have two modes that are separately/simultaneously captured within the topology: development mode, and deployment mode. Data and other inputs used to develop the model (including data storage and data flow objects) may differ from those used to run the model once deployed. Moreover, the development platform may differ from the deployment platform. For some models, one mode may not exist or not be identifiable. This could include cases where a model exists for extended periods of time in development mode without being deployed, as well as vendor models where the development mode information is limited or not provided. However, the 'modal' nature of models must an inherent characteristic of the object class.

Platform Objects include physical and/or software systems that house data storage objects, models, or delivery tools, or that support the production of data flow objects. For example, a database, in combination with automated or user-interfaced query tools, may drive models that generate analytical reports, and such systems as whole may reside on a server, a non-server memory device, or cloud service. Such systems would fall into the "platform" object class. Similarly, a modeling environment used to develop and potentially house models, e.g. Matlab, would fall into the platform class. By convention, objects housed within a platform are referred to as "nested". Platform objects are able to accommodate many-to-many relationships within its nested objects since, for example, a database may house multiple sub-databases, while a very large database may be distributed across multiple servers.

Delivery Tool Objects represent objects that supply information to users. Effectively, these are the final objects in any purpose-defined topological subset. They are the most downstream of objects in any such subset. These include such things as financial reporting engines, web-based pricing applications, and control-environment diagnostic applications. It should be noted that reports, such as tables, data files, charts or graphs that are generated by reporting systems, which may also store the supporting data and the generated reports, would be considered composite objects, as described below.

Composite Objects are composites of multiple objects designed to accommodate multiple class characteristics. For example, a spreadsheet may behave as both a data storage object and as a model. Essentially, the composite object acts as a wrapper, providing the necessary information to keep the underlying objects fully and independently identified, for each object class it is a member of, and providing an association between class characteristics and the components of the composite object. That is, to re-use the multi-function spreadsheet example above, the composite object would be a dual list of defining characteristics for 'models' and 'data source' objects, and provide a method by which data flow objects could be separately linked to the components. More specifically, some data may flow into the object only to be stored and later fed into some downstream objects and that data flow object needs to exist independently and be fully identified. At the same time, another data flow object may flow into the composite purely to feed the model never to be re-directed to any other objects, and that data flow object needs to exist independently and be fully identified.

Unclassified Objects exist as placeholders for objects required to complete (fill in) a local topology that cannot be properly classified due to insufficient information.

In embodiments, linkages among objects carry the meaning of the activities supported by those objects, and so are themselves specialized objects that store critical relationship/topological information. To maximize integrity, there is preferably a strict rule set governing permissible linkages including permissible nesting relationships, object-to-object restrictions, origination and terminal node restrictions, etc. Table 1 below presents a partial list of possible linkage rules.

TABLE 1

| Object Class | Sub Class | Function | Object Linkage Rules: Object can be linked to: |
| --- | --- | --- | --- |
| Model | Development | Perform model operations on information | Flow or Task Sequence Object |
|  | Deployment |  | Flow or Task Sequence Object |
| Platform |  | Host environment for other Model, Data Storage, Delivery tools or Data Processing objects | Flow or Task Sequence Object |

TABLE 1-continued

| Object Class | Sub Class | Function | Object Linkage Rules: Object can be linked to: |
|---|---|---|---|
| Processing | | Perform non-model operations on information | Flow or Task Sequence Object |
| Storage | | Store information | Flow Object |
| Flow | | Move information | Any except Flow Object or Task Sequence Object |
| Delivery Tool | | Report information | Flow or Task Sequence Object |
| Composite | | Data Processing or Modeling and Data Storage | Flow or Task Sequence Object |
| Unclassified | | Various | Flow or Task Sequence Object |

An IOE system according to embodiments has a set of pre-specified functions that can be executed in a shell to return lists of objects and object relationship information. The pre-specified functions preferably have capabilities to allow for conditions and filters, some of which may be internal to the functions, and some of which may be applied outside the functions in the form of a "where" statement. A standard script-driven and batch executable language may be adopted.

In an embodiment, a straightforward object identification and filtering syntax is provided. For consistency with common object oriented programming, the closest set of square brackets is used to indicate identity as follows:

datastorageobject[33, ioeid=F], or equivalently, datastorageobject[33]

returns the data storage object whose external ID is 33. Here ioeid holds the default value F. Hence datastorageobject [100, ioeid=T] returns the data storage object whose internal ID is 100.

Because the objects are themselves lists, a component extraction syntax is preferably used. Again, for consistency with common object oriented programming, a the dollar sign $ is preferably to indicate an object component. For example, if 'model.name' is an included characteristic of model objects, and the model with an external ID of 23456543 is named "European Windstorm Model", then model[23456543]$model.name returns "European Windstorm Model". Similarly, if 'location' and 'owner' are both characteristics of a 'server' sub-class of platform, then the statement, output<-platform[platform.type=="server", c($ioeid, $location, $owner)]

returns a list of all servers identified by ID, location, and owner.

Some examples of basic functions, as used in an embodiment, are presented below.

topology(x) extracts from the overall topology, a sub-topology based on an object list x, or other subsetting criterion. This function returns a list-object with the appropriate object-level information and formatting to support the generation of visual diagrams and other similar analyses. As with many of the basic functions, the list preferably includes a time/date stamp since the topology is changing in real time.

linksto(n, m, nested=Y) returns a list of objects linked to object n, where the proximity is m steps. That is, if m=1, the list includes only those objects directly linked to n along with the value m for each object returns. If m=2, objects two steps removed from n are included in the list, etc. The default value nested=Y indicates that "nesting" is a form of "linking" which would cause the function to return platform objects that appear within the given proximity range.

inheritsfrom(n, m) applies to data storage objects, models, and delivery tools, and generates a list of data flow objects feeding object n from m levels of directness, along with the value m for each object returns. That is, it generates a data lineage list for any object using data.

Isnestedin(n) returns the platform within which object n is nested. If object n is not nested within any platform, it should return a NULL.

nests(n) applies only to platform objects and returns a list of objects nested within platform n.

supports(a, use="ALL") applies only to delivery tool objects, and works backwards to create a list of all objects topologically upstream from reporting tool a. The "use" modifier allows the user to narrow the topology to apply only to specific uses of a where the object a contains enough information to subset the topology.

Embodiments of the present system include a language that support the twin goals of: i) being able to apply logic to the topology to make transparent any part of it and/or critical characteristics of any part of it; and ii) making the IOE a structural link among data and metadata repositories tied to the objects but not objectified in the IOE. Thus, embodiments preferably support both nested internal functions, and nested SQL statements. This is accomplished through the use of two programming environments. First, an interactive window is provided in which commands can be issued directly against the IOE and the results screened or directed to stored objects or other output file formats. Second, a scripting environment is provided in which multi-line programs can be written, tested, stored, and executed either manually or by chron activation.

Embodiments employ direct nesting of internal functions as in the following example:

dplot(topology(supports(CCAR.engine)))

where dplot( ) is a function that generates a visual diagram for an infrastructure subset, topology( ) is, as described above, a function that creates an annotated list of identified objects, where that annotation includes the required information for graphical display and/or other types of analyses, and supports ( ), as described above identifies all of the objects supporting an end-use reporting tool. Thus, in the example, if 'CCAR.engine' is a tool that creates official CCAR reports, then this one-line statement results in the drawing of a diagram for the entire analytic infrastructure that supports CCAR reporting.

The object-oriented programming convention of applying conditioning through qualifiers expressed in square brackets and working from the innermost condition to the outermost condition is preferably used. For example:

mods<-model$extid[odd(model[type=="Pricing"])]

will result in the return of a vector of external model IDs for which all of the models are pricing models and all have odd ID values. Similarly, list<-nests(platform[33])[models]

will return a list of only models nested in the platform whose ID is 33.

Embodiments of the IOE further permit stacking of statements. In accordance with an embodiment, stacking is the application of sequences of statements that may alternate using the internal functions of the IOE and referencing the topology directly, and using SQL or a similar language to recover information from sources external to the IOE based on IDs returned/filtered/processed internally. For example, using the example presented immediately above,
    list<-nests(platform[33])[models]
    SELECT ModelOwner
    FROM CHARACTERISTIC.MODELINVENTORY
    WHERE MODELID IN list
preferably returns a list of model owners corresponding only to models nested in the platform whose ID is 33, and leaving list as an object in temporary memory. Alternatively, and avoiding the preservation of an intermediate object in temporary memory, the condensed statement,
    SELECT ModelOwner
    FROM CHARACTERISTIC.MODELINVENTORY
    WHERE MODEL IN (nests(platform[33])[models])
accomplishes the same thing.

Embodiments of the present IOE also include options for updating external reference data, as well as updating objects and topological relationships.

Given that each object is defined by a fixed set of characteristics, the IOE preferably contains a coding capability wherein a vector or character string is designed with a fixed format that applies to all objects in the IOE. Specifically, this string contains all of the fixed characteristic data for each object so that each segment of the string corresponds to a specific fixed characteristic, including the class and subclass information. For example, assuming that there are not more than 99 high-level object classes, the first two digits of the string could contain a code (1-99) indicating what class of object the class is from. Letting the maximum length of the internal object ID be n, then the next n digits could contain the internal ID, and so on. With an appropriately long and properly segmented string, every object can be represented and fully characterized by its string.

The IOE preferably has certain built-in diagnostic capabilities targeted primarily toward automated integrity checking and maintenance. Among these is the capability to capture and retain the history of the complete topology. Assuming a syntax where "all" is a permissible subsetting criterion, this could be as simple as running the statement, Topology(all).

In embodiments of the present system, there are preferably four modes for the user to interact with the IOE via a Graphical User Interface (GUI): 1) a View mode, where the user can view any section of the topology and Characteristics by Object; 2) a Modify mode, where the user can add, change and delete Objects or Characteristics; 3) a Compare mode, where the user can visualize the difference between two diagrams; and 4) a Query mode, where the user can interrogate the topology and Characteristics using standard queries and user-generated queries (script writing). Query results can be tabular (reports) or diagrammatic results in which case the diagram will appear in the View Box. Each mode brings up a different screen format. The portion of the GUI that the user sees is referred to herein as the "screen" as opposed to the logic which dictates what appears on the screen which would be the unseen parts of the GUI.

Figure 2:
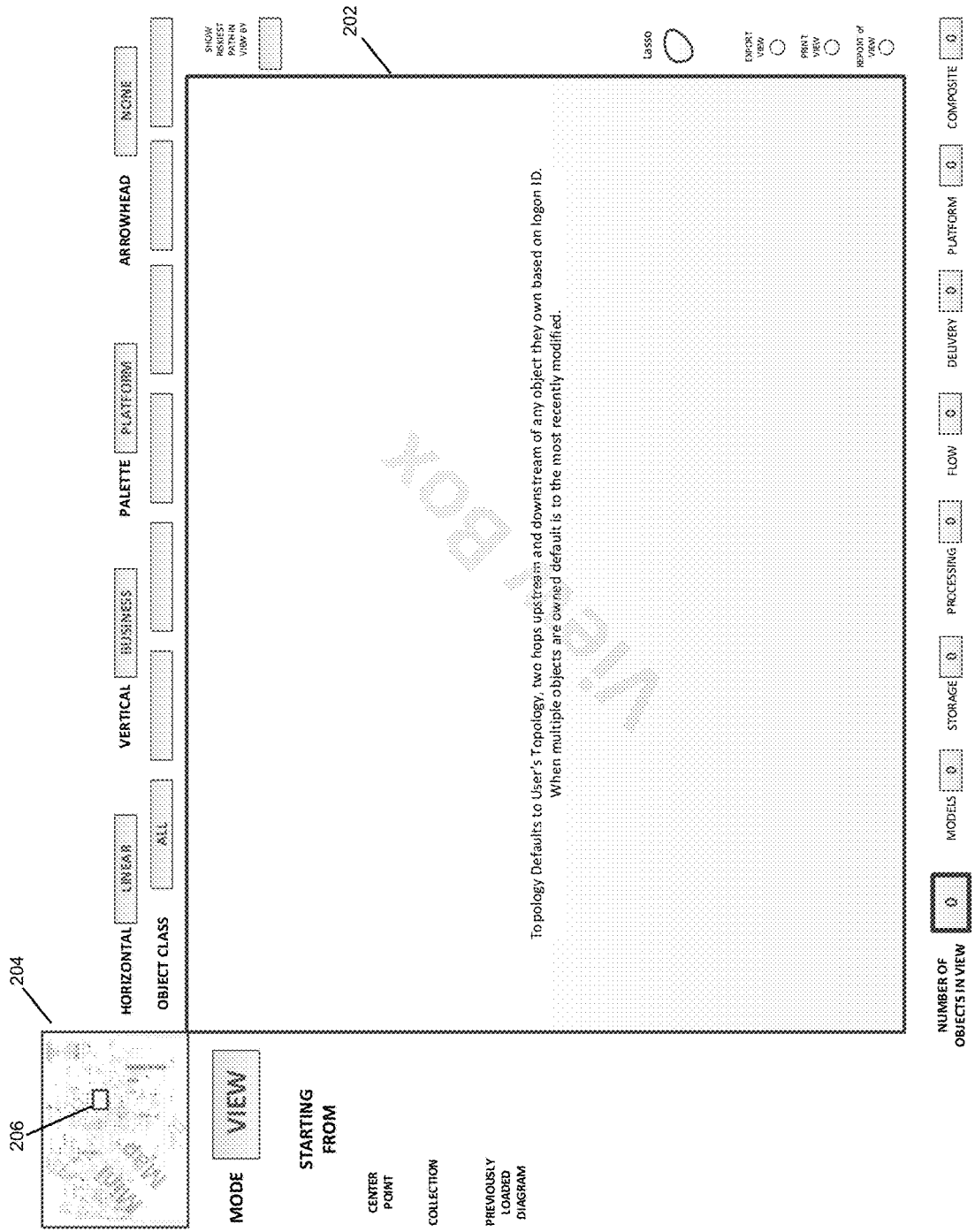
FIG. 2 is a diagram illustrating a view portion of a graphical user interface for use in an integrated object environment, in accordance with an embodiment of the invention.
Figure 3:
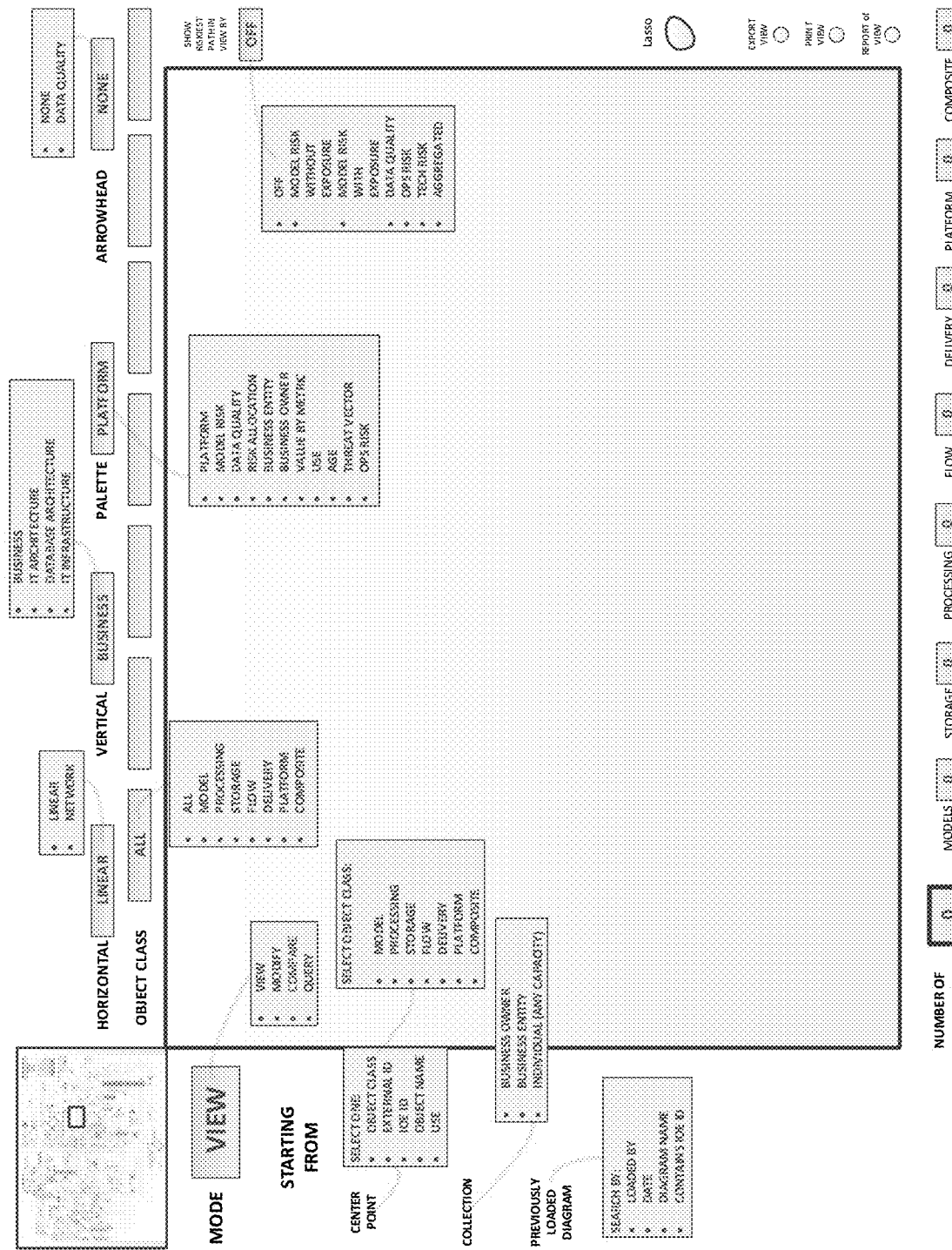
FIG. 3 is a diagram illustrating drop down menu options for a view portion of a graphical user interface for use in an integrated object environment, in accordance with an embodiment of the invention.

Turning to FIGS. 2 and 3, an exemplary GUI for a View mode is now described, in accordance with an embodiment. The screen contains a view box 202 that occupies most of the screen. Within the view box the user is presented with the topology to view, modify or compare. The view box is view-only in the View and Compare modes, while it is interactive in the Modify mode.

The screen also contains a mini map 204, located in the upper left corner, displaying a depiction of the topology. The default view of the mini map 204 is preferably of the entire company's topology. Objects and labels may be too small to be seen individually, but the mini map 204 nonetheless shows the user where within the entire company topology the current View is located. The mini map 204 preferably defaults to the following View options:
    Horizontal: LINEAR
    Vertical: BUSINESS
    Palette: PLATFORM
    Arrowhead: NONE
    Object Class: ALL Within the mini map 204 is a locator box 206. Regardless of how the user zooms in and out of the Mini Map, the Locator Box encompasses the same topology and so expands or contracts to remain in sync with the mini map display 204 as the zoom function is exercised. When the cursor is not in the Mini Map 204, the Locator Box 206 displays the same boundaries represented by the View in the View Box 202. This is accomplished by automatically shifting position, shrinking and expanding borders, to encompass topology represented in the View Box 202. The functionality of the mini map 204 is more fully described with respect to Table 2.

TABLE 2

| Cursor position | On Mini Map outside Locator box | Inside Locator Box |
| --- | --- | --- |
| Single left click | Demarcates the Mini Map based on Landmarks set up by the IOE System Administrator. This is a toggle on/off (a second left click removes Landmarks) | Activates locator box boundary allowing user to expand or contract any side or corner of the locator box |
| Double left click | opens the Mini Map to full screen overtop existing screen. Escape key or double left click shrinks Mini Map back to normal size. Mini Map and Locator Box retain full functionality in this full screen mode. | Transfers topology inside the Locator Box to replace what is in the View Box |
| Single right click | Brings up properties of the Mini Map. One property allows the user to change the default View options of the Mini Map | Allows user to open another View Box filled with the contents of the Locator Box. Up to six View Boxes can be open at the same time. |
| Mouse wheel forward | Zooms in the Mini map. The Locator Box boundaries remain fixed relative to objects rather than remaining fixed relative to size on the screen. | Zooms in the Mini map. The Locator Box boundaries remain fixed relative to objects rather than remaining fixed relative to size on the screen. |
| Mouse wheel back | Zooms out the Mini map. The Locator Box boundaries remain fixed relative to objects rather than remaining fixed relative to size on the screen. | Zooms out the Mini map. The Locator Box boundaries remain fixed relative to objects rather than remaining fixed relative to size on the screen. |

The intelligence embedded in the stored topology can be viewed in a variety of ways through the GUI, both in terms of the object-to-object relationships and the associated characteristics of objects. One way is by varying the appearance of the visual elements using visual dimensions. Another way is by selection of View options which includes Topology Type, Horizontal and Vertical Views.

The presentation of a topology's objects in the GUI is preferably designed to maximize the amount of information depicted in a sub-set of the topology (referred to as a "View") by using particular shapes and lines to depict the value, range of values of a specific characteristic or the sub-class of the object. The shapes themselves are also used as dimensions as they differentiate object classes. Aside from shapes, which represent the object class of the object, there are at least two other dimensions for depicting intelligence; Color and Line Weight. The two dimensions of Color and Line Weight are preferably applied to visual elements of the Topology and are preset rather than being a user option. The system may permit user-defined dimensions in the case of special Views. For instance, a shape fill color may represent platform association in the default view, but represent model risk in a specific Palette View (see below). The number of characteristic or sub-class values possible for each visual component is thus limited only by the differences the normal human eye can detect on today's screens.

Listed below are the two dimensions of Color and Line Weight applied to the visual elements and in parenthesis the number of possible values. Combining two visual element options can lead to many more possible key characteristic or sub-class possibilities. For instance the combination of Border Thickness and Border Line color can represent 2×4 or 8 different possible key characteristic values or sub-classes.

Border thickness (2)
Border line color (4)
Shape fill color (20)
Shape border color (6)
Flow Line thickness (2)
Flow Line color (4)
Flow Arrowhead fill color (6)

Thus, in embodiments of the present system, visual dimensions in the View mode may be used, for example, to depict the model object status through a shape's border thickness. A shape's fill color may depict model risk levels in model objects when selecting the model risk palette View. Similarly, a Flow line color could depict whether the flow is generated automatically or manually invoked.

The GUI of the IOE in embodiments of the present system include multiple ways for a user to select a subset of the topology to view, for example: Mini Map; Single Object Selection; Multiple Object Selection; and other options. With a Mini Map, the user selects the View by entering one or more of the following from a drop-down menu (the list below is not an exhaustive list). The scope of the topology presented includes all objects connected upstream and downstream within the selection criteria requested. The GUI also provides the user with an option to have the output appear in a table which can be exported as excel file. If the criteria entered is not currently stored in the IOE, the user is given the option to add new topology, described more fully below. With a Single Object Selection, the user may specify a Use, ObjectID and/or Object Name to identify an object, along with all objects feeding into and all objects being fed by the Object selected. With a Multiple Object Selection, the GUI permits the user to specify a Business entity, a diagram previously imported, a person's name, and/or an object class or subclass. Once the selection is made, the GUI permits the user to refine the view by filtering on a variety of criteria. For example, filters may include limiting to upstream or downstream paths only. Another filter may permit a user to enter a start point or end point (or both) in addition to the View criteria above (e.g., End point=Technical Pricing Model, showing all objects related to business unit=Commercial. The resulting diagram is drawn showing all objects connected to any object which feeds ultimately to the Technical Pricing Model. Without an upstream limit, the diagram shows all upstream relationships.) The GUI preferably permits user selection of other options to view the topology, which can be selected in combination with one another. A summary of View options, in accordance with an embodiment, is shown in Table 3:

TABLE 3

| View Name | Options | Description |
| --- | --- | --- |
| OBJECT CLASS | All Classes | All object classes are depicted |
| | Specify Object Classes (Flow objects will not be shown unless all object classes are selected) | User can select one or more classes to depict. Data Flow Lines will not be depicted unless all classes are selected. In lieu of data flow lines, objects will be joined by lines that look like data flow lines but the arrow heads will be a different shape. |
| HORIZONTAL | Linear | An instance of a particular Data Storage object appears for every extract and load downstream of the initial instance of the Data Storage object in the View |
| | Network | all Data Storage objects appear only once in the View |
| VERTICAL | Business | Highest level functionality |
| | IT Architecture | Application centric |
| | IT Infrastructure | Hardware centric |
| PALETTE | Platform | color fills the object shapes based on the platform that hosts the object. Objects not hosted by platforms will have white fill. |
| | Model Risk | color fills the object shapes based on the value of the risk characteristics for the models in the view |
| | Data Quality | color fills the Flow arrowhead shapes based on the value of the value of data quality characteristic for the data elements feeding the object. This palette can be selected |
| | Risk Capital Allocation | color fills the object shapes to indicate the absolute value of Risk capital allocated to the object. |
| | Business Entity | color fills the object shapes based on the Business Entity or Entities that use the output from a Path of objects |
| | Business Owner | color fills the object shapes based on the business entity that owns or co-owns the object |
| | Value by Business Metric | color fills the object shapes to differentiate the value of the business metric(s) associated with each production chain of objects in the view. |
| | Use | color fills the object shapes based on the Uses within the View |
| | Age | color fills the object shapes based on the value of the age characteristic for that object |
| | Technical Threat Vector | color fills the object shapes based on the value fo the technical risk ranking characteristic of that object |
| | Operational Risk | color fills the object shapes based on the value of operational risk characteristic of the object or its associated control |

TABLE 3-continued

| View Name | Options | Description |
| --- | --- | --- |
| ARROW-HEAD | None<br>Data Quality | Arrowheads depicted in solid black color fills the Flow arrowhead shapes based on the value of the value of data quality characteristic for the data elements feeding the object. This palette can be selected |

These available options are more fully illustrated in FIG. 3, which shows options available through drop-down menus of user-selectable items on the screen in the IOE GUI's View mode, in accordance with an embodiment.

Figure 4:
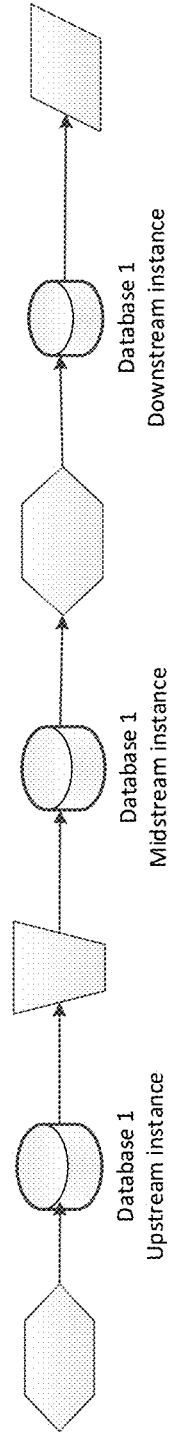
FIG. 4 is a diagram illustrating a horizontal view in a graphical user interface for use in an integrated object environment, in accordance with an embodiment of the invention.
Figure 4:
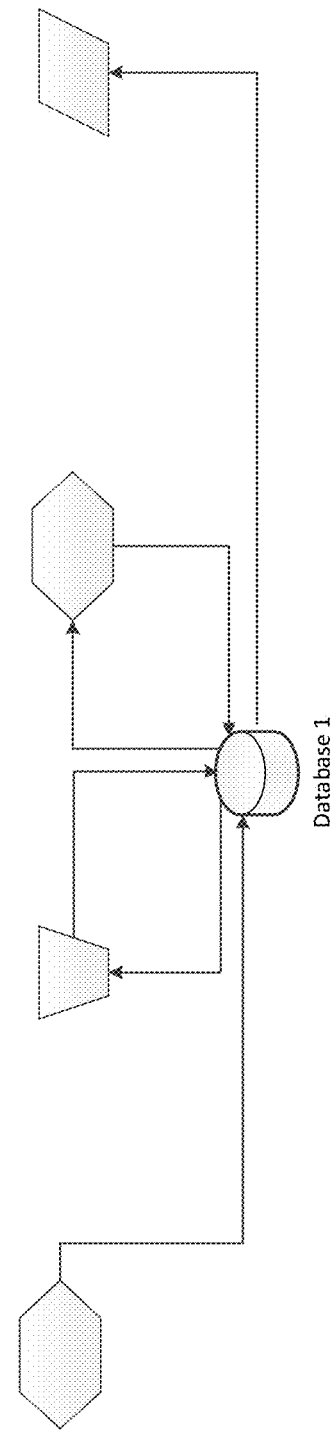

Turning to FIG. 4, a Horizontal View is described, in accordance with an embodiment. The GUI permits the Horizontal View to be shown in multiple ways. For example, a Linear View 402 depicts the production chain of information assets as the data flow sequentially progresses downstream through the chain of information assets. This Linear View is created by following the path of data elements in the data flow objects as they are passed from object to object. Since objects are stored in the IOE as a single instance, the multiple loads and extracts to the same database in a View are depicted as unclassified objects in the topological space allowing depiction of the proper sequence of the production chain. These Unclassified Objects are created dynamically whenever a Linear View is requested. The Characteristics of these dynamically created Unclassified Objects equals the Characteristics of the Storage Object for which it represents an instance of. For example, if model X produces calc "A" and calc "A" is subsequently loaded to database STS, and model Y extracts calc "A" from STS, then by inference, model X and model Y are on the same production chain and X is upstream of Y. On the Linear View, Model X will be connected to Model Y with a Data Flow object to a Unclassified Object representing the storage in STS followed by a Data Flow object connecting the Unclassified Object to Model Y. If STS is loaded and extracted from multiple locations along the production chain, then a proxy shape will be depicted on the View at each load and extract point to maintain production chain continuity.

The Horizontal View may also be depicted as a Network view 404. The Network view does not use the data element lineage to infer the path of the production chain but rather depicts only a single instance of an object in the View. Thus, all loads and extracts to a common object (e.g. data store object) are shown as immediate upstream and downstream objects. Production chain lineage is not maintained.

Figure 5:
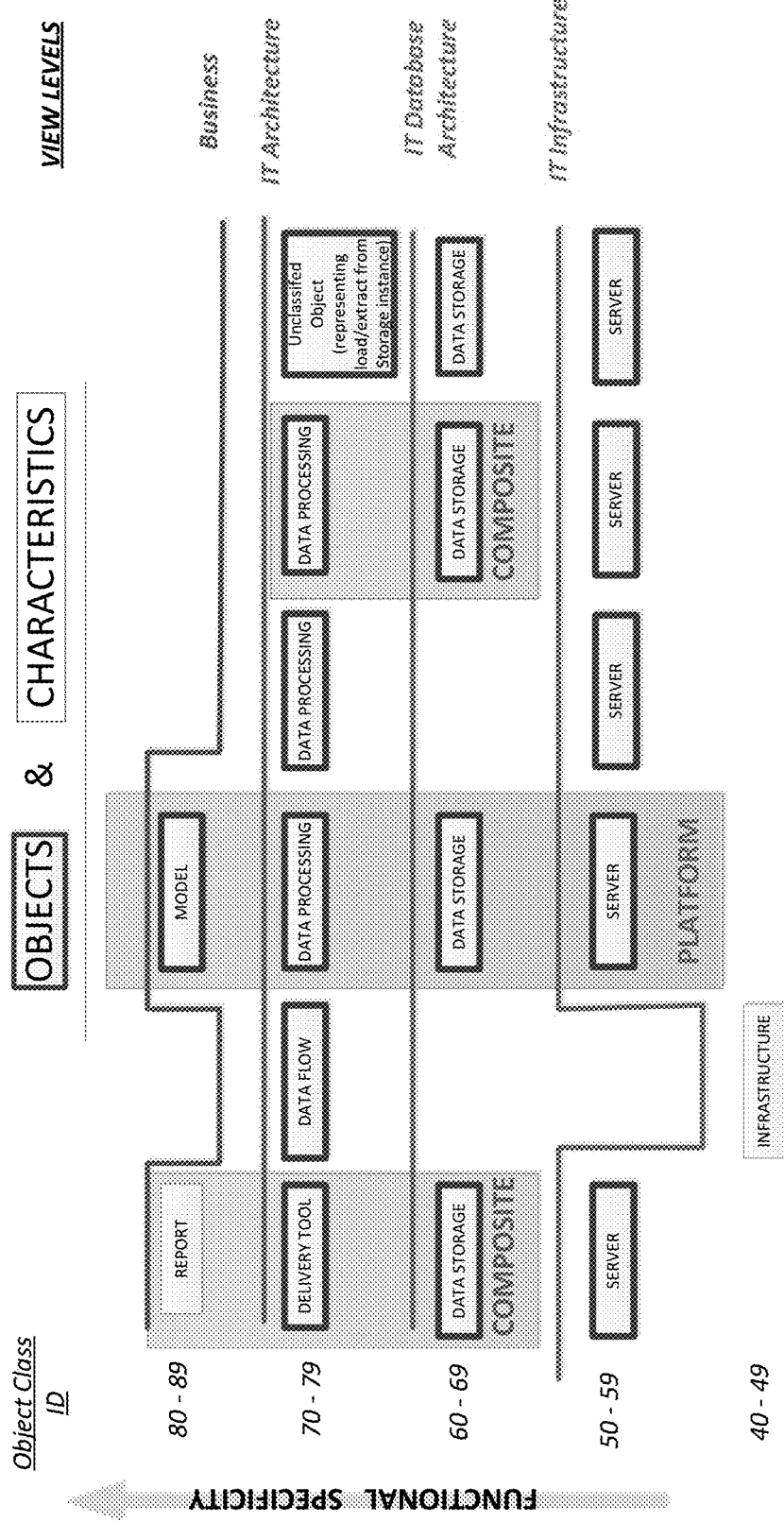
FIG. 5 is a diagram illustrating a cross-section schematic of a vertical view in a graphical user interface for use in an integrated object environment, in accordance with an embodiment of the invention.
Figure 6:
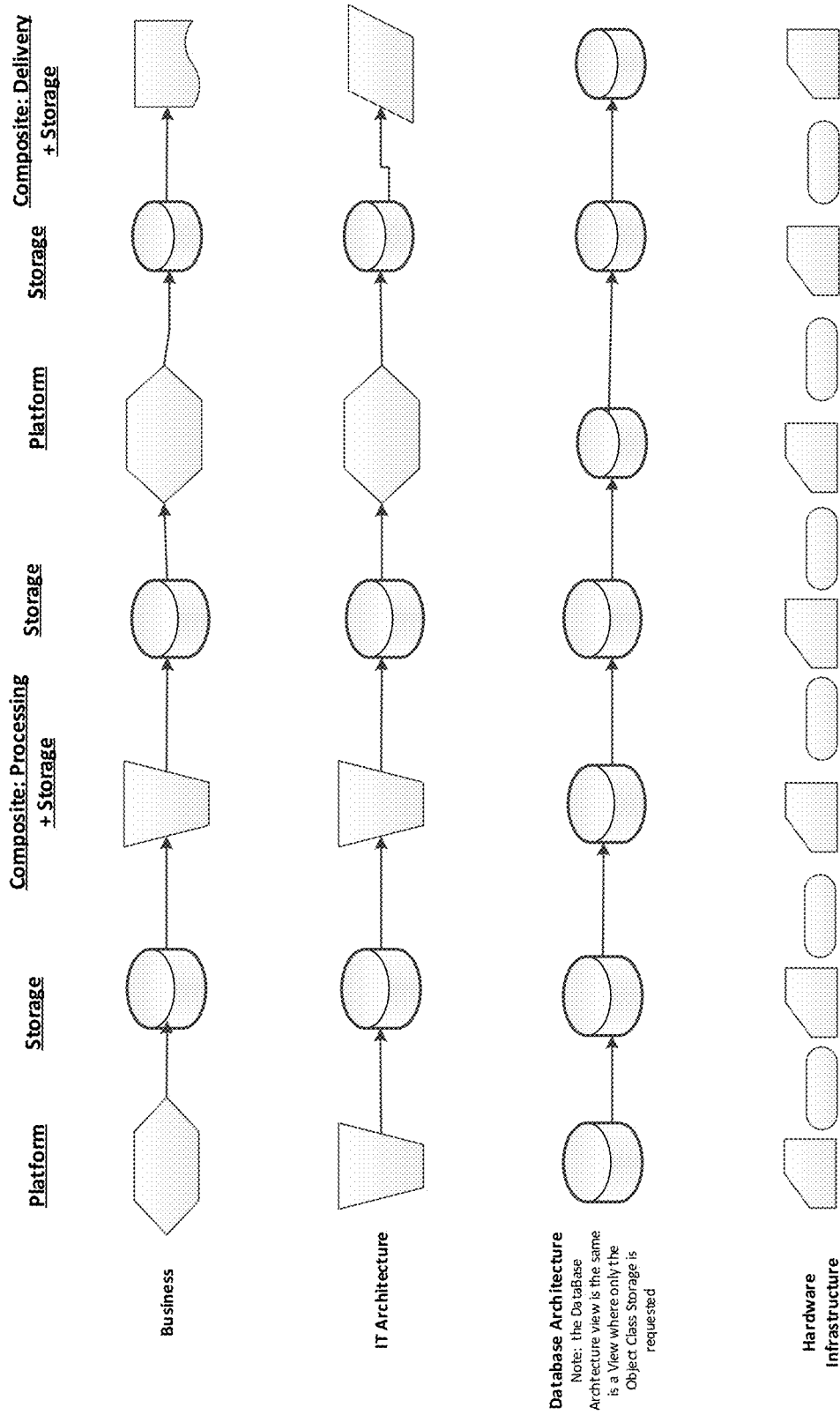
FIG. 6 is a diagram illustrating examples of a vertical view in a graphical user interface for use in an integrated object environment, in accordance with an embodiment of the invention.

With respect to FIG. 5, a Vertical View is described, in accordance with an embodiment. The Vertical View option allows the user to tune the Functional Specificity of the objects depicted. This is useful when Platform and Composite objects exist within the View. In the Vertical View, Composite and Platform objects are considered to be stacked as if in a functional support silo. In this manner, the Vertical View simplifies the View by isolating only those components of Composite and Platform objects that are essential to the needs of the viewer. In operation, the user selects View Level for the Vertical View (e.g. Business), the IOE looks for the Object class IDs (first two digits of the Internal ID) based on the chart above, and depicts those objects on the View. The user can also by-pass the standard View Levels and create their own Vertical View by specifying which object classes to be depicted. Examples of Vertical Views, in accordance with embodiments, are shown in FIG. 6.

Figure 7:
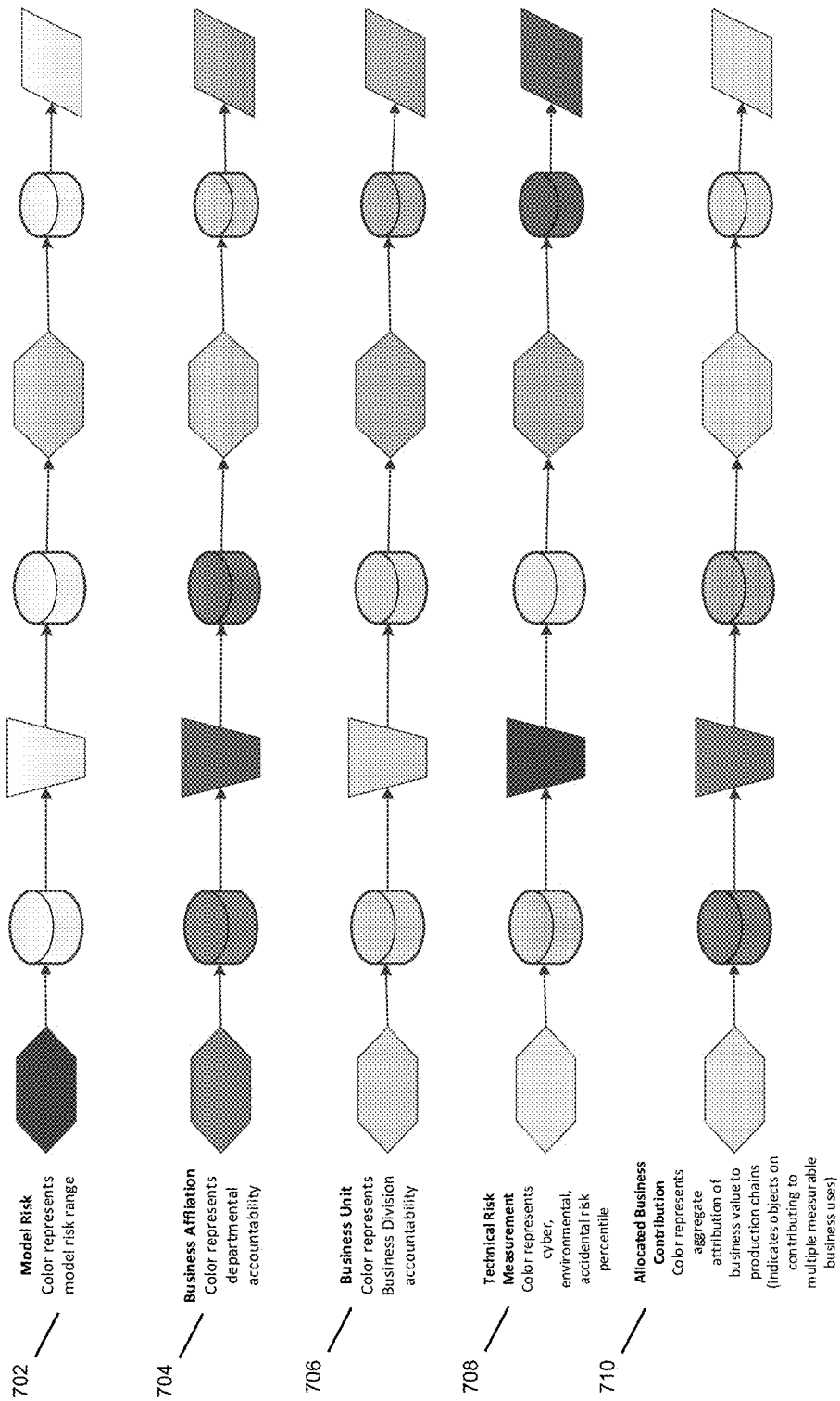
FIG. 7 is a diagram illustrating an example of a palette view in a graphical user interface for use in an integrated object environment, in accordance with an embodiment of the invention.

An example of a Palette View, in accordance with embodiments of the systems, are shown in FIG. 7. Palette View options allow the user to highlight a particular set of Characteristics that are preset such as risk, business ownership, age, etc. A Palette is a View that embeds the intelligent of a different set of key characteristics other than the default View. This is accomplished by switching the mapping of the Visual Elements to characteristics different than what is in the default View. Examples of Palette Views include:

Model Risk: color fills the object shapes based on the value of the risk characteristics for the models in the view.

Business Owner: color fills the object shapes based on the business entity that owns or co-owns the object.

Business Entity: color fills the object shapes based on the Business Entity or Entities that use the output from a Path of objects.

Use: color fills the object shapes based on the Uses within the View

Age: color fills the object shapes based on the value of the age characteristic for that object Technical Threat Vector: color fills the object shapes based on the value of the technical risk ranking characteristic of that object Data Quality: color fills the Flow arrowhead shapes based on the value of the value of data quality characteristic for the data elements feeding the object Operational Risk: color fills the object shapes based on the value of operational risk characteristic of the object or its associated control Value by Business Metric: color fills the object shapes to differentiate the value of the business metric(s) associated with each production chain of objects in the view.

Risk Capital Allocation: color fills the object shapes to indicate the absolute value of Risk capital allocated to the object.

A special mode of the Palette View is preferably invoked within the Compare Mode. In this mode the Palette View is locked on the Compare option which utilizes the color coding set forth in the Compare Mode.

In the example of FIG. 7, a Model Risk view 702 uses color to represent a range of risk based on the risk characteristics for models in the view. A Business Affiliation view 704 uses color to represent differences in accountability for different business departments. A Business Unit view 706 uses color to represent business division accountability. A Technical Risk Measurement view 708 uses color to represent different types of risk (e.g., cyber, environmental, accidental, etc.). An Allocated Business Contribution view 710 uses color to represent aggregate attribution of business value to production chains (e.g., to indicate objects contributing to multiple business uses).

An Arrowhead View is also used in embodiments of the present system to depict Data Quality measurement. The method is by color coding the arrowhead fill space. The default Arrowhead color is black. In this View, for arrows showing the flow between objects in the View, the arrowheads fill with color based on the risk measurement of the upstream calc and data at that point. For example, three relative gradations of risk could be represented (e.g., red for the highest 10% of risk scores; yellow for the upper half of risk scores; and green for the lowest half of risk scores. A clear arrow can represent that data is missing.) Values to determine Data Quality score will be set by Contributors.

Figure 8:
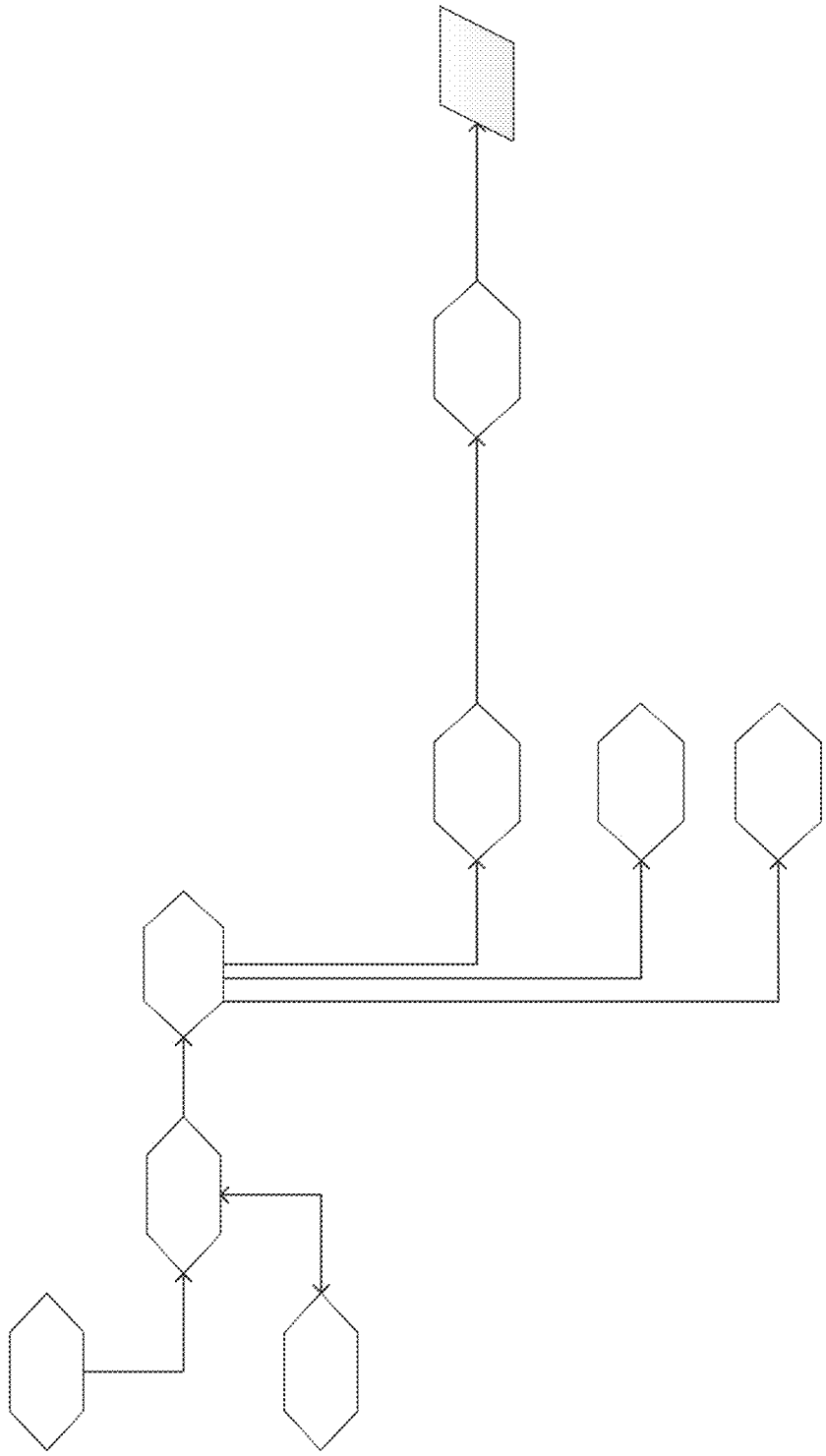
FIG. 8 is a diagram illustrating an example of an object class view in a graphical user interface for use in an integrated object environment, in accordance with an embodiment of the invention.

Turning to FIG. 8, an Object Class View for display in the GUI is described, in accordance with an embodiment. Generally, the View defaults to displaying all Object Classes. However, a user can restrict this display by selecting only one or a subset of Object Classes to the View. In FIG. 8, the user has selected Vertical View=Business and Topological View=Infrastructure, with Palette view=Platform.

In embodiments of the system, the GUI provides options for a user to select levels of granularity for display. For example, objects can be decomposed once given enough characteristics, such as with models. A View Option can be selected to depict the internal modules of a model inside a model shape. Similar capability exists for other objects such as Platforms and Composite Objects.

Figure 9:
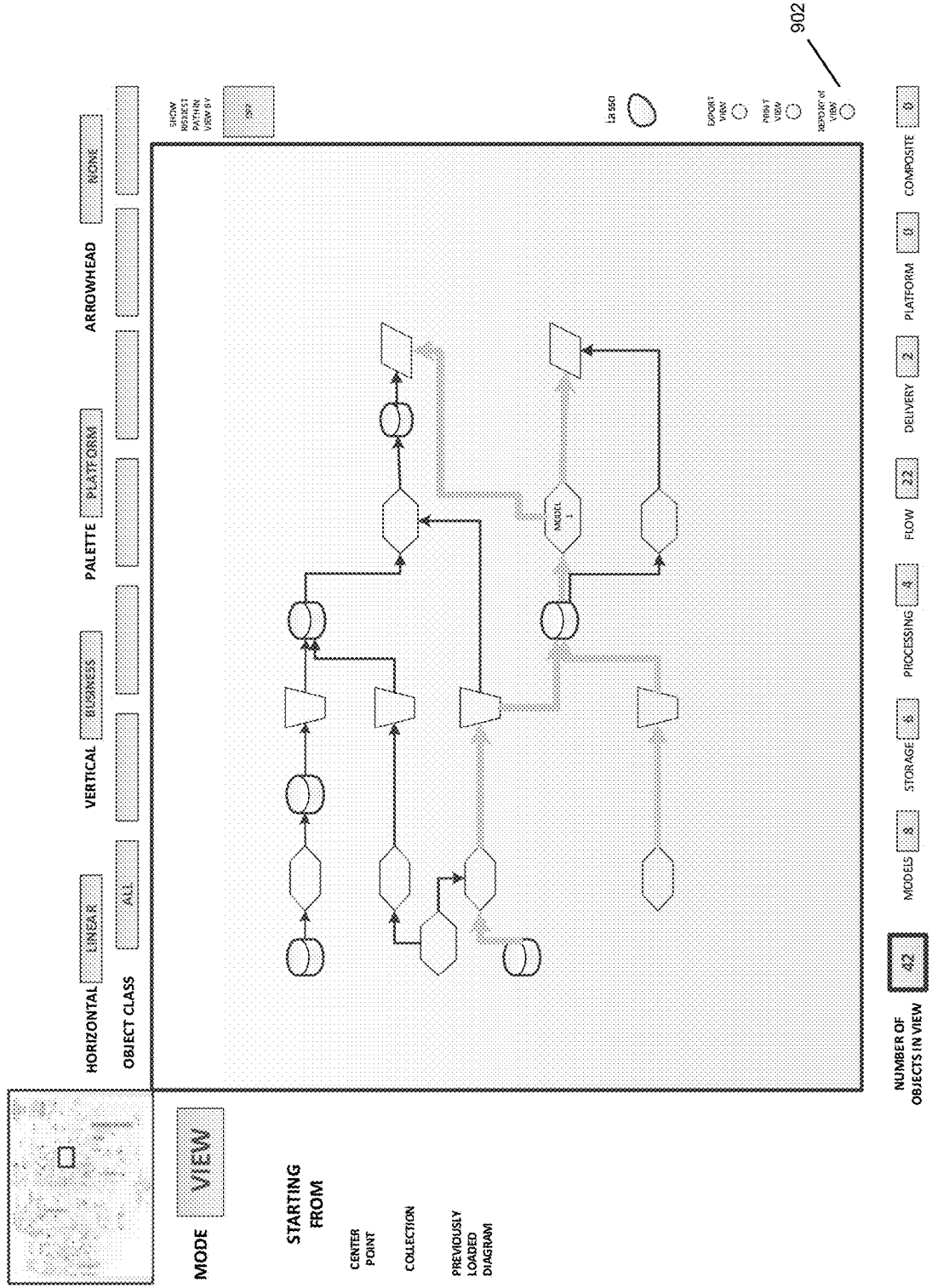
FIG. 9 is a diagram illustrating an example of a path highlight in a graphical user interface for use in an integrated object environment, in accordance with an embodiment of the invention.
Figure 10:
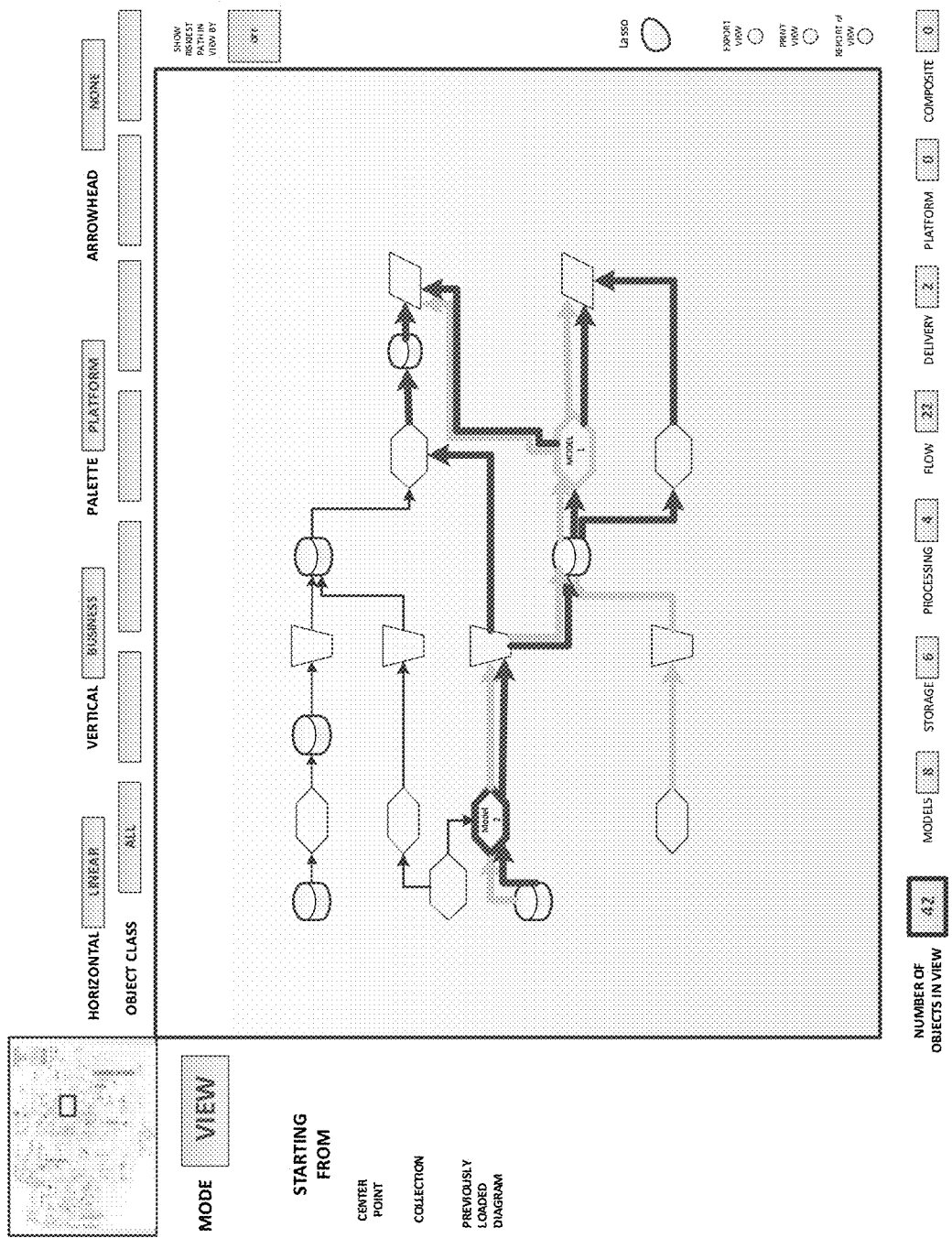
FIG. 10 is a diagram illustrating an example of a path highlight in a graphical user interface for use in an integrated object environment, in accordance with an embodiment of the invention.

The GUI of the IOE preferably includes a variety of interactive functions for the user. One such interactive function is path highlighting, described herein with reference to FIG. 9. The user clicks on an object in the topology on the screen and the View then highlights the upstream and downstream flows into and out of the object selected. The highlighting is preferably accomplished by using the thicker line weighting on the Flow Objects in different color than normally used for lines. Clicking again on the object toggles this feature off. Paths upstream and downstream from up to six objects can be toggled on at the same time. A different highlighting color may be used for each. The GUI further permits selection of multiple objects for path highlighting, as shown in FIG. 10. The Path Highlight can be converted into a Report by clicking a report icon 902 on the screen. Clicking this icon prompts a box to appear asking the user if they would like the Upstream Paths, Downstream Paths or both. Following this selection, the user is asked to select which object classes they wish to include in the report. Following this selection the user is asked which Characteristics of the Object Classes selected would they like on the report.

The GUI also preferably includes an option for viewing a full list of the characteristics of an object by double (left) clicking the object. Further, double-clicking on a Characteristic brings up the company's Business Glossary entry for that term. The list appears with an "x" in the upper right corner to allow the user to close the list. The Characteristic list can be converted into a Report by clicking a report icon on the screen.

The GUI also preferably includes an option for Navigating the View Box, whereby the user can scroll or grab and drag in any direction to see the horizontal limits of the View.

Figure 11:
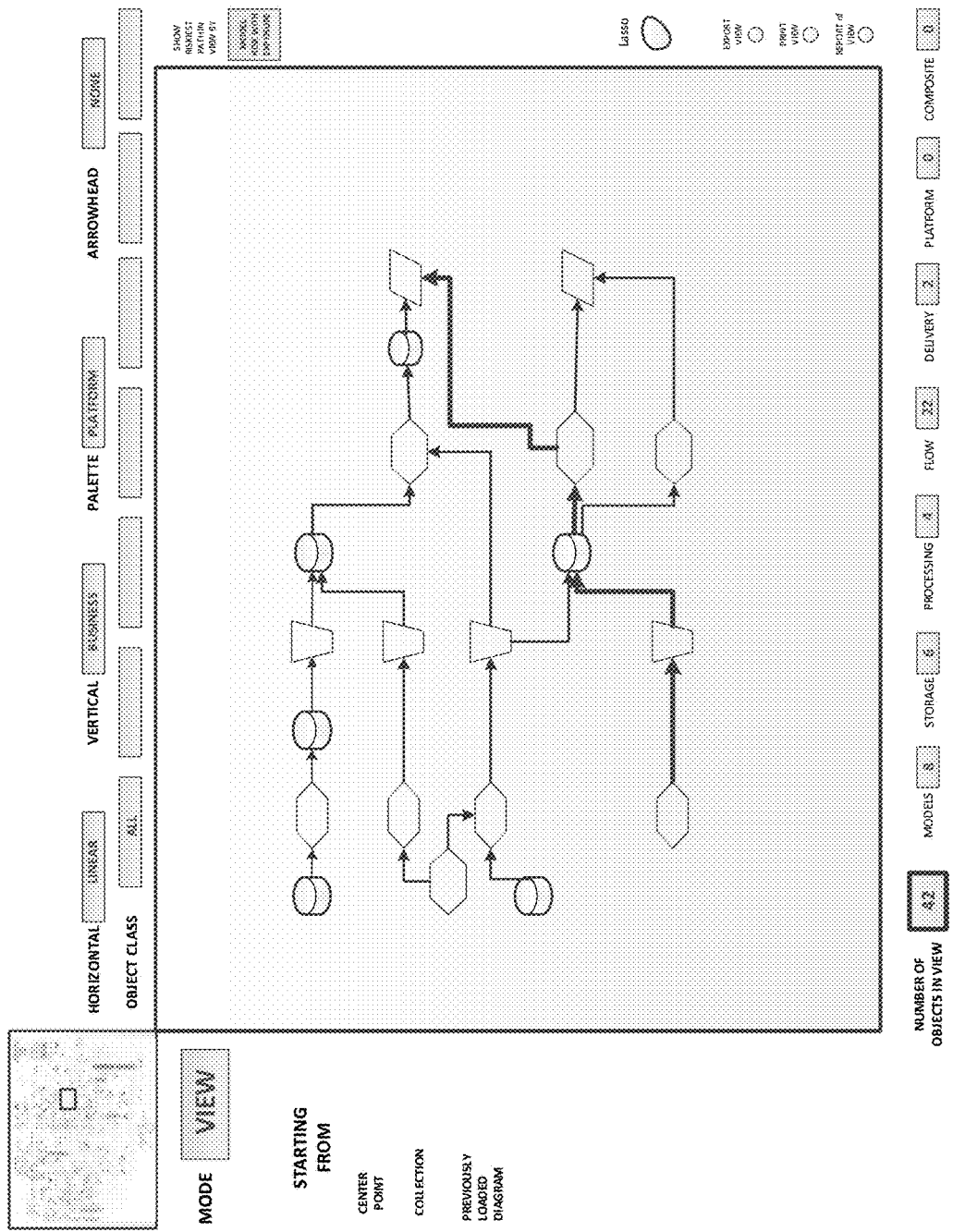
FIG. 11 is a diagram illustrating an example of a riskiest path view in a graphical user interface for use in an integrated object environment, in accordance with an embodiment of the invention.

The GUI also preferably includes an option for calculating and displaying the Riskiest Path. The user selects one of the risk metrics and the IOE computes based on pre-loaded formulae the path with the highest risk based on the metric selected by the user. The riskiest path will appear highlighted (e.g., in red) as seen in FIG. 11. A sample list of risk metrics include: Model Risk without exposure; Model Risk with exposure; Data Quality; Ops Risk; Tech Risk; and Aggregated Risk.

The GUI also preferably includes an option for searching diagrams previously loaded into the IOE database. The results of the search are preferably returned in tabular form, and include the External IDs for the list of diagrams where the model was loaded, thus permitting a user to select a diagram to view. Alternatively, the search results are returned by Business Affiliation (e.g Business Unit), or by the Name of Object (e.g., the user first selects the type of object they are looking for, then enters the name). The IOE then return closest results if no exact match found. The results preferably include the Name of Object, the object's load date, and the name of the person who imported the object into the IOE database.

The GUI of the IOE also preferably includes links to external documents. In this manner, an icon is presented within an object to indicate that a document electronically stored outside of the IOE has been linked to the object. The icon represents the document format. By clicking on this icon, the application which supports the document opens and the document appears on the screen.

Within a screen of the GUI of the IOE is preferably a box which allows the user a quick way to calculate the risk of the selected View. Clicking this box creates both a visual depiction of the information requested as well as giving the user the option of printing the report. Examples of those risk reports include: Aggregate Model Risk of the View, which calculates the aggregate model risk for all models in the View; Depict Riskiest Path, which depicts the Path whose objects in aggregate measure riskiest versus all other Paths in the View, using a formula preferably based on Risk value characteristics of the Objects; Depict Lowest Data Quality Path, which depicts the Path whose data elements in aggregate measure lowest in data quality versus all other Paths in the View, using a formula preferably based on Data Quality value characteristics of the Data Elements; Calculate Aggregate risk by View, which depicts risk values of the objects of the View aggregated based on an aggregation formula.

The GUI of the IOE also preferably includes an option to export. Any View created in the IOE is exportable to a graphical design program, such as Microsoft Visio, by clicking on the Export button on the right side of the View Box. The map of Visio shapes to IOE shapes is the same as the import function.

Figure 12:
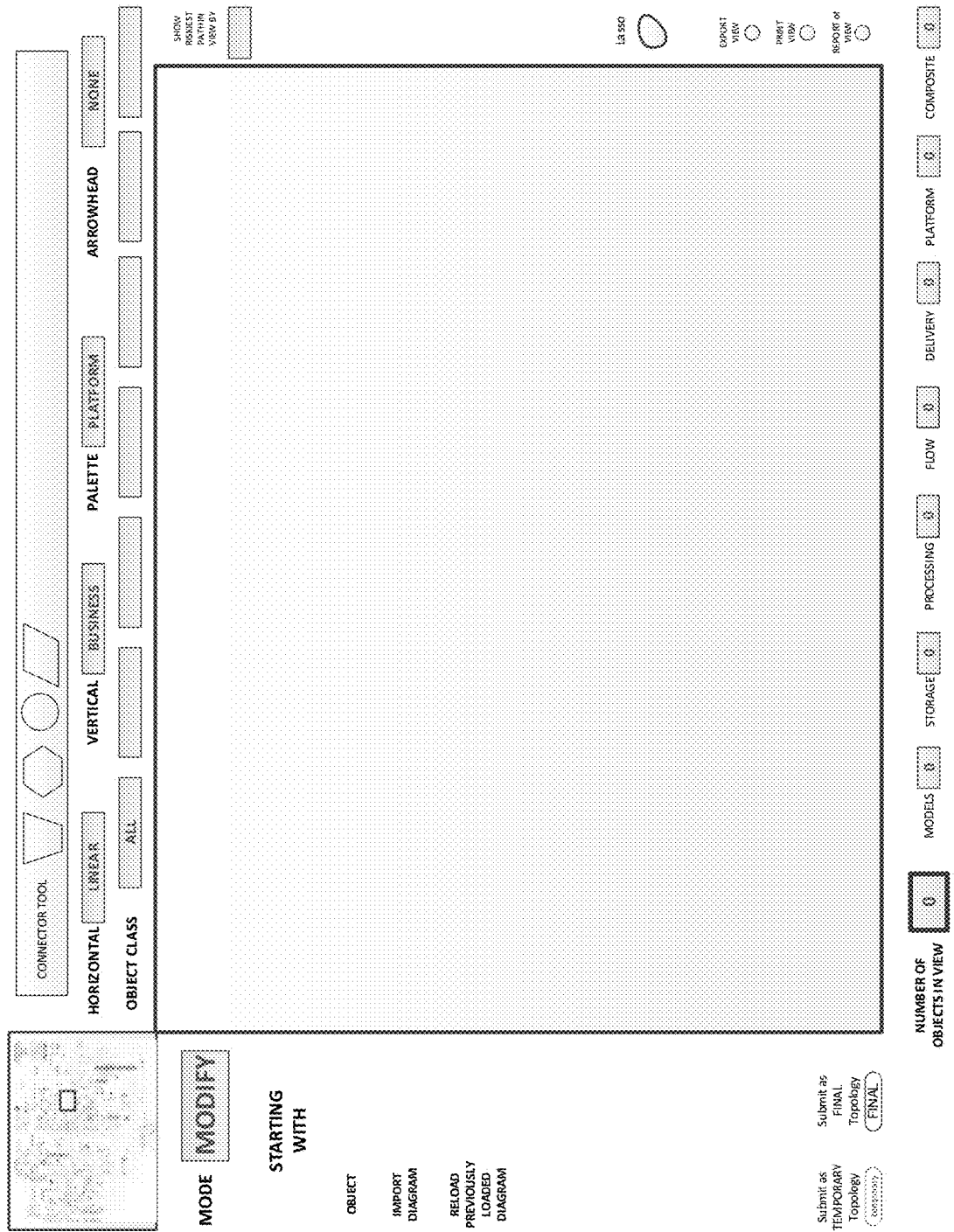
FIG. 12 is a diagram illustrating an example of a modify mode in a graphical user interface for use in an integrated object environment, in accordance with an embodiment of the invention.
Figure 13:
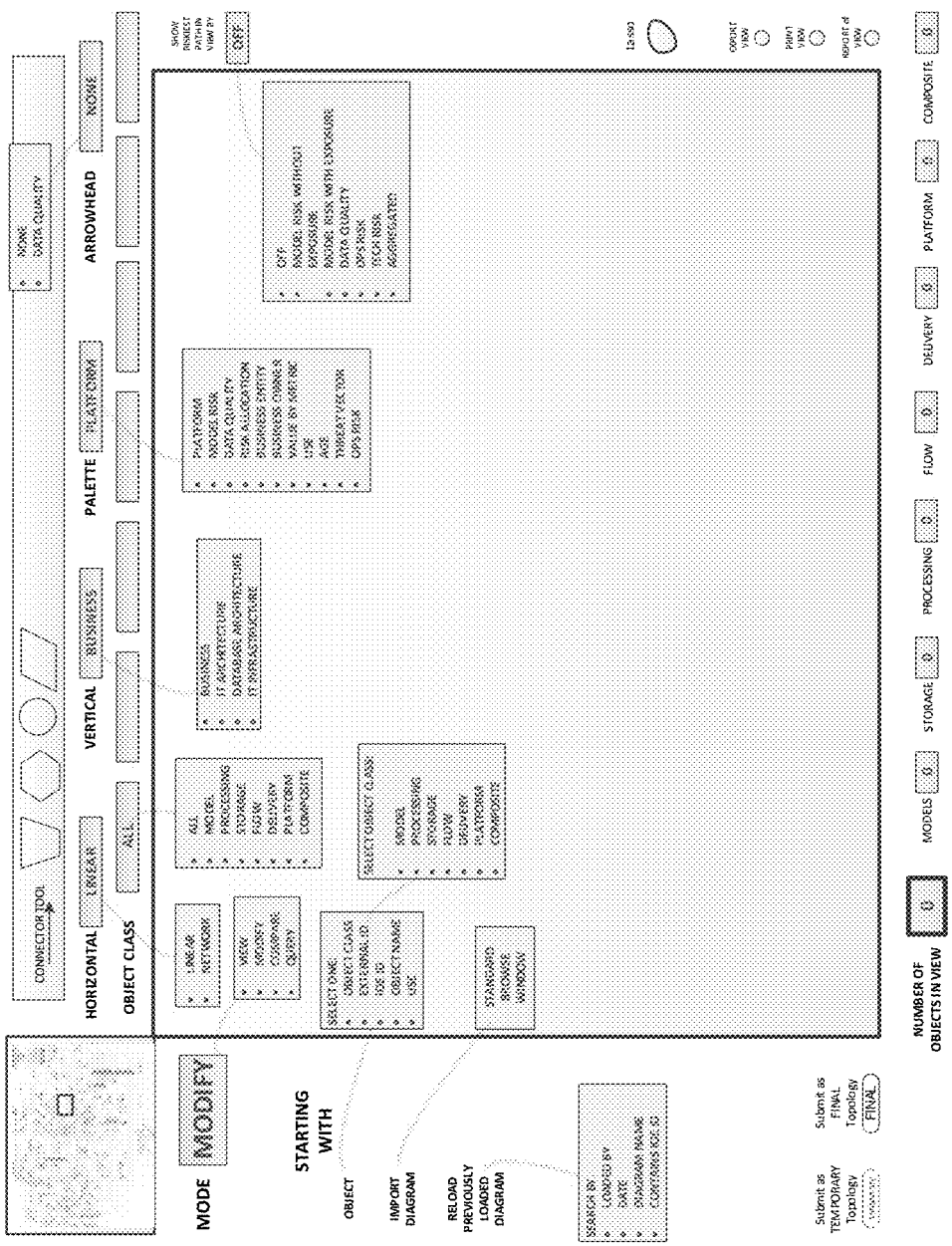
FIG. 13 is a diagram illustrating drop down menu options for a modify mode in a graphical user interface for use in an integrated object environment, in accordance with an embodiment of the invention.

Turning to FIGS. 12 and 13, a modification mode for the IOE is described, in accordance with an embodiment. The GUI for the modification mode is similar to that of the view mode, but permits a user to add objects and connectors using a similar interface and drop-down menus, and through an import function for graphical object files, such as Visio diagrams.

A map is preset that maps Visio shapes and formats to IOE shapes and formats. The user selects the import function in the IOE GUI, which first checks to see if object already exists in IOE based on external ID number first, then name match. If the object already exists, a message is posted to the screen, such as, "The following objects matched existing objects from the IOE, new relationships will be loaded to existing object." The existing Objects are then updated with new relationships based on the imported Visio diagram. The import function also preferably provides utilities for computing and displaying object count by class and total count once diagram is imported, and for saving the diagram objects so that it can be reproduced for audit purposes, so it can be used in diagram comparisons, and to allow users to select as a View in the future.

To add an objection directly to the IOE, the modification mode of the GUI includes a screen for the user to select a method for adding an object, such as External Object ID, Use, Business Affiliation, Name of owner, and Name of object. If the IOE returns a topology with the object(s) already stored that match the criteria the user entered, then the user can browse the list to see if the object they want to load is already in the IOE. If not, the user can then add the object. Alternatively, the user can modify the object(s) found.

The user populates the canvas by dragging necessary shapes to the canvas and entering the minimum amount of information to initialize the object in the IOE. Those minimums are stated in the Core section for each Object Class.

To connect objects on the screen, the GUI provides Flow Objects, which preferably connect to any point on the Object shape in the diagram to allow for clarity in the depiction of the topology. Double clicking on the object opens the characteristics table. Double clicking on the Characteristic permits the user to make necessary changes and save. The GUI further preferably permits en masse changes (e.g. property change for entire object class) by selecting an object class, and selecting a class change option.

In embodiments of the IOE, unless saved as FINAL, a modified topology will not be saved in the production topology when the session ends. Instead, the temporary topology, in whatever manner it was modified, is saved in a Temporary topology and the user modifying can name the temporary saved topology, such that any changes between existing and temporary modifications are highlighted. Further, in order to preserve past states of the topology, the IOE preferably stores the history of the full IOE topology on a periodic basis.

Figure 14:
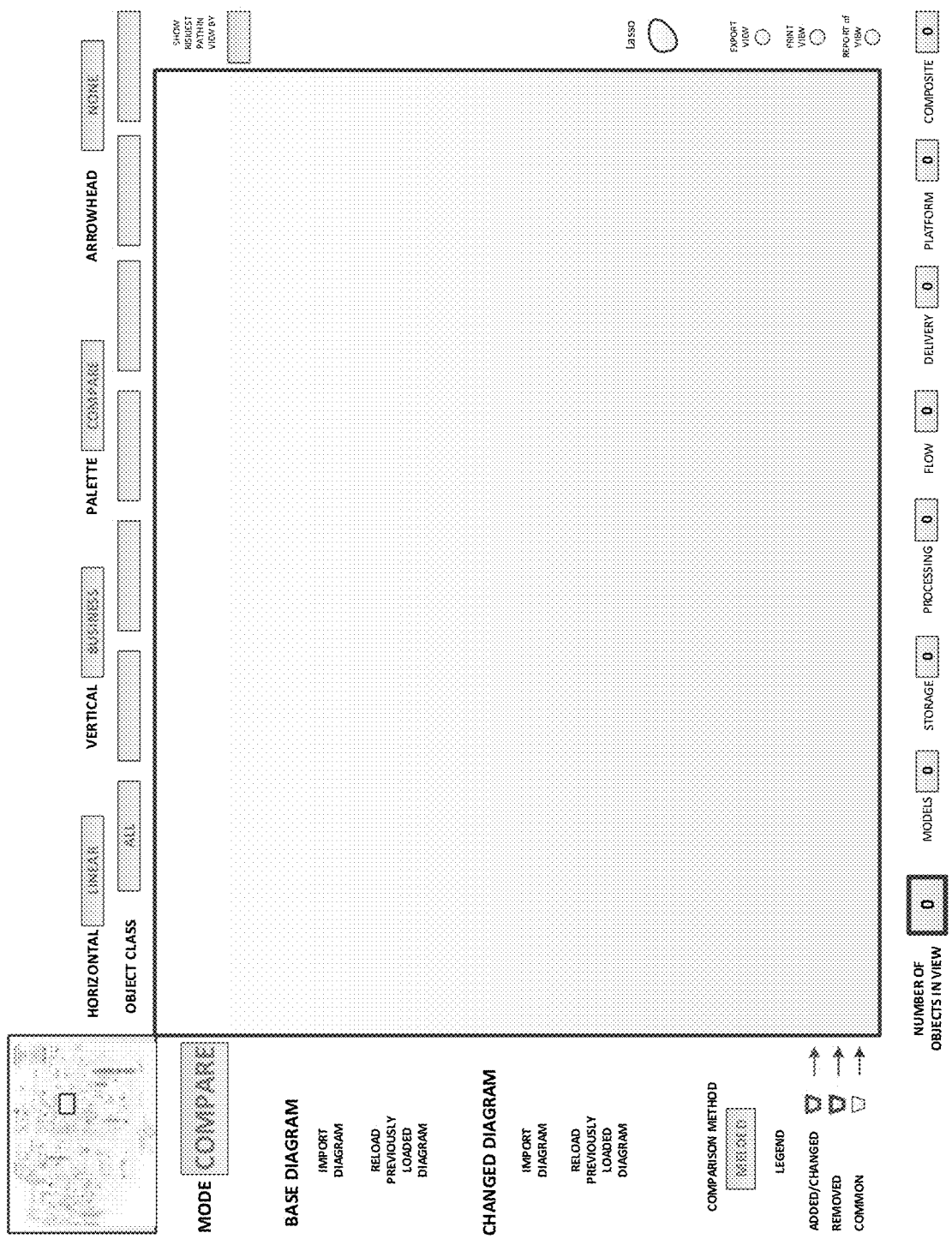
FIG. 14 is a diagram illustrating an example of a compare mode in a graphical user interface for use in an integrated object environment, in accordance with an embodiment of the invention.
Figure 15:
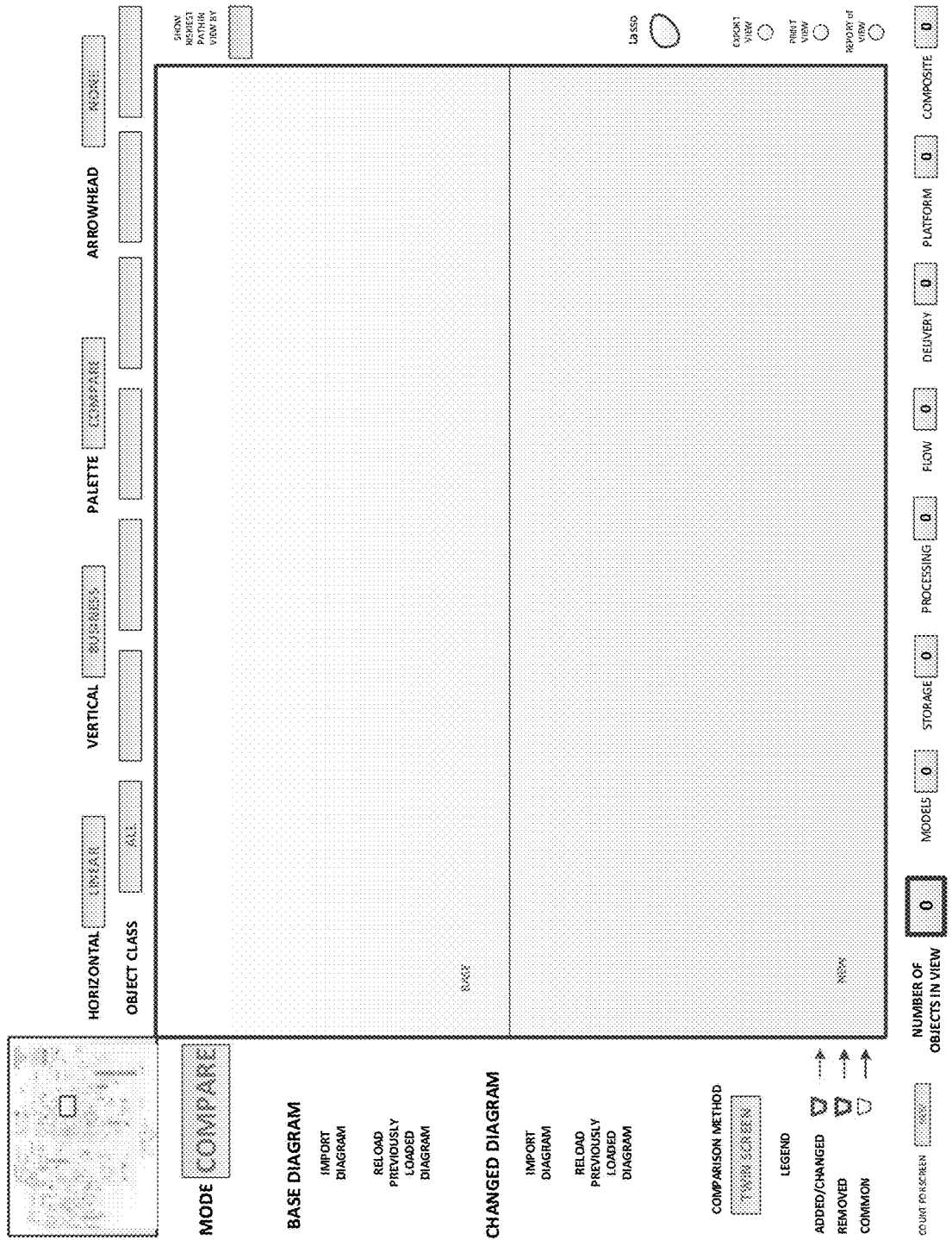
FIG. 15 is a diagram illustrating an example of a compare mode in a graphical user interface for use in an integrated object environment, in accordance with an embodiment of the invention.
Figure 16:
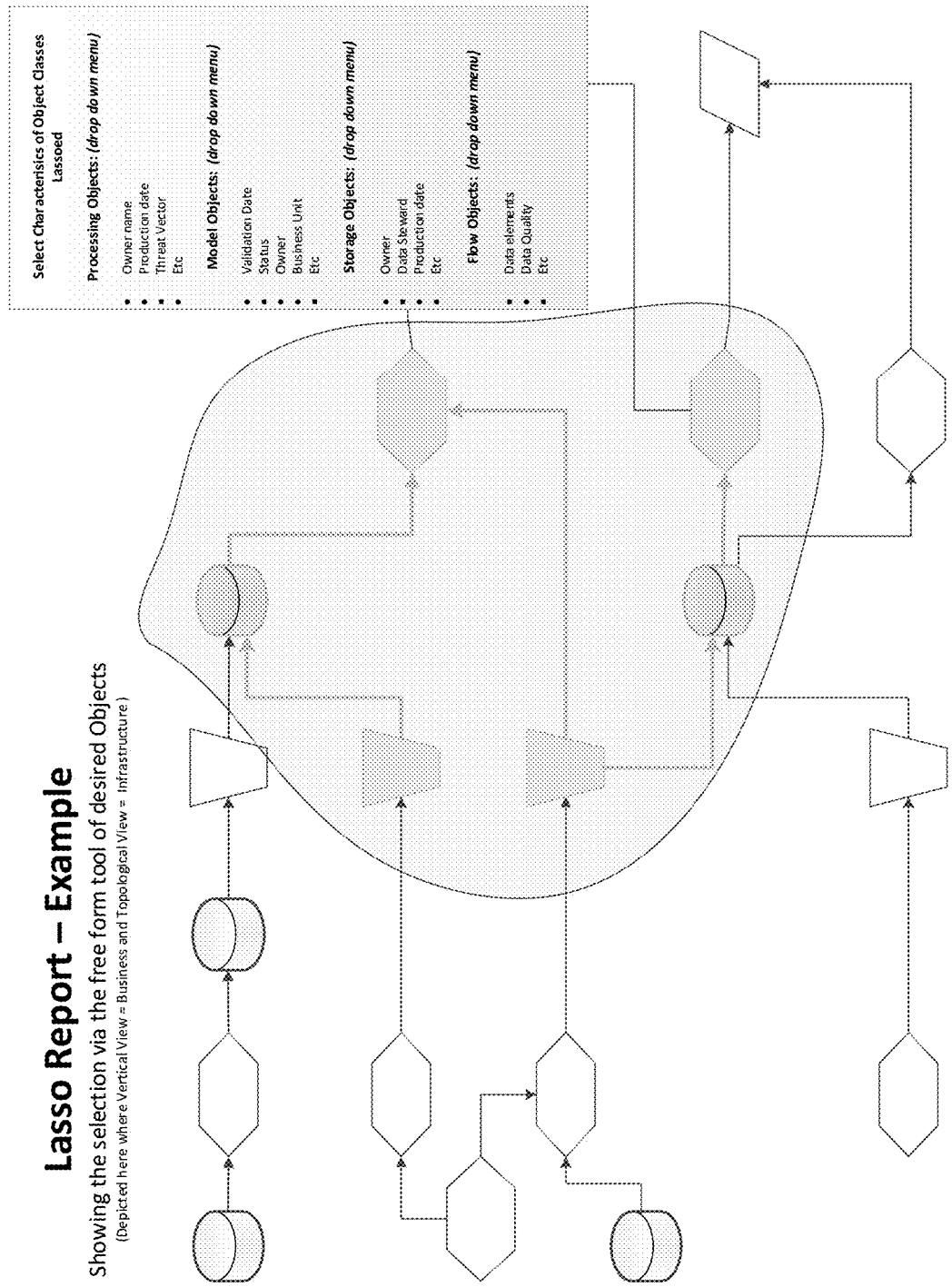
FIG. 16 is a diagram illustrating an example of a lasso report selection in a graphical user interface for use in an integrated object environment, in accordance with an embodiment of the invention.

Turning to FIGS. 14 and 15, a compare function of the IOE is described. A user selects two diagrams: a diagram previously imported into Visio and a diagram to be imported. One will be the "BASE" and the other will be the "CHANGED". Comparisons can be done from any View Option combination. Embodiments preferably include two different methods for comparing; 1) Melding, where all objects from both diagrams are displayed and color coded to indicate which are Common, which are New and which were on the Base diagram only (FIG. 14); and 2) Twin Screen, where both the diagrams are displayed with the same color code representing the change in Object from Base to Changed (FIG. 15).

Embodiments of the present system include advanced reporting capabilities. In addition to standard reports discussed above, special reports can be created using the GUI. Examples of such reports include Tree Pair File Reports and Lasso Reports. A Tree Pair File Report identifies pairs of objects of the same class upstream of the selected object. These pairs are referred to as "Tree Pairs." A Tree Pair is defined as a pair of objects, connected via a Data Flow object through any combinations of objects. The user selects the one or more objects for the query to determine the Tree Pairs. These selected objects will be displayed in the first column of the report. Working upstream from the selected object, each object of the same class, regardless of any object(s) between the selected model and itself, is considered a part of the tree of the selected object's class. In succession, the query continues looking upstream from each object in the same object class in the Tree for the next object. This in turn creates an object Pair. The query continues upstream along each Path and Branch of the tree until the last object of the same class is found. The collection of Pairs for a the selected model are referred to as Tree Pairs of object class of "x" where "x" is a given selected model. The collection of objects that feed the selected object may be connected linearly or in a forked path. If there is a loop (a sequence in which an object appears more than once), then the sequence is stopped at the second instance of that object.

The GUI also permits the creation of Lasso Reports, which are reports which use as the select criteria the object set bounded inside an irregular shape drawn by a "freeform" tool (same as the Visio tool called "freeform"). This topology subset can be converted into a Report by clicking a report icon on the screen. Clicking this icon, the user will be asked to select which object classes they wish to include in the report. Following this selection, the user is asked which Characteristics of the Object Classes selected would they like on the report.

A principle of the IOE is that each Object has an owner. This permits assignment of accountability for the Flows feeding and being fed from the Object. Alerts and Acceptances (see following section) require knowing the owner of an Object. Informing contributors and consumers of the Topology is a key benefit of the IOE. Since characteristics are linked to objects in the topology the changing of key characteristics affects not only the contributors and consumers of that object but also those contributors and consumers downstream. Alerts can be built that can take advantage of the community and accountability within a common topology to warn others of changes that impact them by virtue of their location on the topology.

In embodiments of the system, there are several types of Alerts. One type of alert is a Key Characteristic Changes. Conditions are set for each object class for Alerts to be generated upon the change in a characteristic when a new value is entered that is outside set parameters. These values are either associated with the object in the binary object code, or are characteristics in the relevant repository of characteristics for that object class. A periodic delta check of the repository preferably looks for new values outside the parameters for each object class.

The Alerts can also be tailored based on the relationship with Upstream and Downstream objects. The Alerts are sent via email or other means of electronic communication to advise the owner of the targeted object that a change to a characteristic with a related object has changed outside parameters. An example of this is a change to model status. When a model validation expires, the expiration needs to be communicated to downstream objects of the model. An email can be generated to the owners of the model classes deemed to be impacted by the change to the model characteristic of validation status to inform them of this fact so that they may take action to mitigate the resulting risk.

Changes to characteristics can also include formulas that calculate risk parameters based on new raw values put into to characteristics of one object but flow downstream to other objects. Entire paths are preferably monitored for changes to aggregate characteristics values. For instance, a production chain of four models might be set to alert downstream consumers of those four models if the aggregate model risk of the four models exceeded a certain amount.

Another type of alert used in embodiments of the system are for Object Capability Changes. This is a more robust set of Alerts, which can be used to notify upstream and downstream object owners that an object has been added/removed/replaced or otherwise undergone alteration in capabilities. This Alert is signaled as higher importance than a Characteristic change. An example of such an Alert is where a model owner sources data from a new vendor. This addition to the IOE then triggers an alert to all downstream object owners.

Still another type of alert is for new use of sourced data and generated calculations. When users draw flow objects from storage objects and add data elements to the Flow Object Characteristics, the IOE preferably locates the source of the calculations (Model Object) and the source of Data Elements (Storage Object). Once identified, the IOE sends an Alert to the owner of the Model and Storage object advising them that their Data and Calculations are being sent to a new object.

The IOE system administrator can set Acceptance requirements for modifications to the topology. Setting Acceptance Criteria requires the IOE to send an email or other such electronic message to the designated responsible party within a set amount of time of Criteria being met. The designated party then has a set amount of time to Accept the modification. Rejecting, or failing to Accept the modification requires removal of the modification and a notice sent to the modifying party. Both these set times can be set by the IOE system administrator. Examples of Acceptance Criteria include: Model Owners must accept the modification of use of their Model's output; Storage Owners must accept the modification of use of their Storage output; Process Owners must accept the modification of use of their Process output; Any Object owner must accept the addition of or subtraction of Flow Objects to the Object they own.

Characteristics from Structural Metadata Repositories for the respective object in the IOE are preferably loaded into the IOE on a daily basis. History is preferably saved for a defined period. The IOE is preferably informed of new and updated topological links and objects using importation of visio diagrams or by diagram maintenance interface. The IOE preferably allows queries originating in Structural Metadata repositories to query the topology in the IOE.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

It is understandable to those skilled in the art that all or a part of steps of the processes in the preceding embodiments is preferably implemented by relevant computing hardware instructed by a program. The program may be stored in a computer readable storage medium. The storage medium may include a ROM, a RAM, a magnetic disk or a compact disk.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented graphical user interface and integrated object environment system, comprising:
   a graph database storing graphical representations of topologies of physical infrastructure components for an enterprise as objects and relationships among the objects, the graphical representations comprising characteristics for the components, wherein data flow between the objects is defined as an object class stored in the graph database;
   an integrated object environment (IOE) system, coupled to the graph database and further coupled to a communications network;
   the IOE system being configured to stack statements by applying sequences of the statements that alternate using internal functions of the IOE and referencing the topologies of the physical infrastructure components;
   the IOE system being further configured to stack statements by using SQL to recover information from sources external to the IOE system based on identifiers that are at least one of returned, filtered or processed internally;
   the IOE system being further configured to update external reference data, the objects and topological relationships;
   a computing device comprising a display unit, the computing device coupled to the IOE system through the communications network and operable to:
      generate a display for the display unit, the display for representing a first topology from the graph database and comprising:
         a viewing region for presenting the first topology in one of a plurality of pre-determined views;
         a mini map region for presenting the context of the first topology within a representation of a larger topology for the enterprise; and
         one or more data regions for presenting calculated data based on the characteristics of the components in the first topology.

2. The system of claim 1, the display further comprising a user-selectable input option, for causing the computing device to request a representation of a second topology for importation into the graph database.

3. The system of claim 1, further comprising computer executable instructions embedded on a fixed tangible medium, which upon execution, cause the computing device to perform the steps of:
   prompting the user for a selection of a component of the presented first topology via the display;
   receiving a query from the user relating to the selected component via the display;
   visually presenting in the viewing region, in response to the query and based on the characteristics of the components, responsive other components in the first topology.

4. The system of claim 1, the display further comprising:
   a user-selectable modify option;
   a modification tools region comprising a plurality of user-selectable modification tools including shapes and connectors; and
   a user-selectable submit option,
   wherein modifications made to the first topology with one or more of the modification tools are saved in the graph database upon selection of the submit option.

5. The system of claim 1, the display further comprising a user-selectable component selection option for selecting a plurality of topology components displayed in the viewing region, and further comprising computer executable instructions embedded on a fixed tangible medium, which upon execution, cause the computing device to perform the steps of:
   receiving a user selection of the component selection option, via the display;
   interacting with the user via the display to select a plurality of topology components displayed in the viewing region;
   obtaining characteristic information relating to the selected components;
   performing calculations based on the obtained characteristic information; and
   presenting the calculations via the display.

6. The system of claim 5 wherein the user-selectable component selection option is a lasso selection tool.

7. The system of claim 3 wherein visually presenting the responsive other components comprises displaying one or more directed paths between the responsive other components based on the characteristics for the components.

8. The system of claim 7 wherein each of the one or more directed paths is differently colored.

9. The system of claim 7 wherein the directed path represents a flow of information between the responsive components.

10. The system of claim 1, wherein the object representing each of the physical infrastructure components represented in the topologies stored in the graph database is selected from a predetermined set of object classes.

11. The system of claim 10, wherein each of the set of object classes is represented as a set of fixed characteristics.

12. The system of claim 1, wherein the relationships among the physical infrastructure components represented in the topologies stored in the graph database are represented by a set of pre-defined links.

13. The system of claim 12, wherein the object representing each of the physical infrastructure components represented in the topologies stored in the graph database is selected from a predetermined set of object classes.

14. The system of claim 1, wherein the relationships among the physical infrastructure components represented in the topologies stored in the graph database are represented by a set of pre-defined links.

15. The system of claim 14, wherein the object representing each of the physical infrastructure components represented in the topologies stored in the graph database is selected from a predetermined set of component object classes.

16. The system of claim 1, wherein the mini map is further configured to at least one of:
  activates a locator box boundary allowing a user to expand or contract any side or corner of the locator box;
  transfer the topology inside the locator box to replace what is in a view box;
  allow the user to open another view box filled with contents of the locator box;
  zoom in the mini map such that the locator box boundaries remain fixed relative to the objects rather than remaining fixed relative to a size on a screen; or
  zooms out the mini map such that the locator box boundaries remain fixed relative to the objects rather than remaining fixed relative to the size on the screen.

17. The system of claim 1, wherein the IOE system is configured to at least one of:
  include pre-specified functions that are configured to be executed in a shell to return lists of the objects using a component extraction syntax and to return the relationships among the objects;
  employ direct nesting of internal functions; or
  update external reference data, the objects and topological relationships among the objects;
  include diagnostic capabilities configured for automated integrity checking and maintenance including capturing and retaining a history of the topologies of the physical infrastructure components; or
  interact via a graphical user interface using a view mode, a modify mode, a compare mode and a query mode.

18. The system of claim 1, wherein the IOE system is configured to provide an interactive function of path highlighting, wherein the path highlighting comprises the object in the topology being selected on a screen and highlighting upstream and downstream flows into and out of the object selected, wherein the highlighting uses thicker line weighting on flow objects in different color than for lines.

19. The system of claim 1, wherein the IOE system is configured to convert a path highlight into a report by selecting a report icon, wherein the selecting prompts selections of at least one of upstream paths or downstream paths for inclusion into the report and prompts selections of characteristics of the object classes for inclusion into the report.

* * * * *